US012675060B2

(12) United States Patent
Kagawa et al.

(10) Patent No.: US 12,675,060 B2
(45) Date of Patent: Jul. 7, 2026

(54) TONER

(71) Applicant: CANON KABUSHIKI KAISHA, Tokyo (JP)

(72) Inventors: Hiroki Kagawa, Shizuoka (JP); Tomohisa Sano, Shizuoka (JP); Tohru Hiramatsu, Shizuoka (JP); Kazuyuki Sato, Kanagawa (JP); Shohei Shibahara, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 542 days.

(21) Appl. No.: 18/307,825

(22) Filed: Apr. 27, 2023

(65) Prior Publication Data

US 2023/0408942 A1 Dec. 21, 2023

(30) Foreign Application Priority Data

Apr. 28, 2022 (JP) ................................ 2022-075103
Feb. 24, 2023 (JP) ................................ 2023-027654

(51) Int. Cl.
*G03G 9/097* (2006.01)
*G03G 9/083* (2006.01)

(52) U.S. Cl.
CPC ....... *G03G 9/09716* (2013.01); *G03G 9/0831* (2013.01); *G03G 9/09725* (2013.01)

(58) Field of Classification Search
CPC ............. G03G 9/0836; G03G 9/09708; G03G 9/09725
See application file for complete search history.

(56) References Cited

U.S. PATENT DOCUMENTS

| | | | |
|---|---|---|---|
| 5,641,601 | A | 6/1997 | Mitani et al. |
| 5,686,054 | A | 11/1997 | Barthel et al. |
| 5,981,131 | A | 11/1999 | Hirama et al. |
| 6,287,739 | B1 | 9/2001 | Kawakami et al. |
| 7,001,703 | B2 | 2/2006 | Moribe |
| 7,097,951 | B2 | 8/2006 | Moribe |
| 7,123,862 | B2 | 10/2006 | Hasegawa |
| 7,147,981 | B2 | 12/2006 | Fujikawa |
| 7,267,919 | B2 | 9/2007 | Moribe |
| 7,279,262 | B2 | 10/2007 | Fujikawa |
| 7,368,211 | B2 | 5/2008 | Hasegawa |
| 7,402,368 | B2 | 7/2008 | Ogawa |
| 7,422,832 | B2 | 9/2008 | Ogawa |
| 7,470,494 | B2 | 12/2008 | Nishiyama |
| 7,582,401 | B2 | 9/2009 | Ogawa |
| 7,678,523 | B2 | 3/2010 | Hiroko |
| 7,678,524 | B2 | 3/2010 | Hasegawa |
| 7,704,659 | B2 | 4/2010 | Ogawa |
| 7,811,734 | B2 | 10/2010 | Ogawa |
| 7,855,042 | B2 | 12/2010 | Kobori |
| 7,923,190 | B2 | 4/2011 | Magome |
| 7,935,467 | B2 | 5/2011 | Dojo |
| 7,939,231 | B2 | 5/2011 | Ogawa |
| 8,084,174 | B2 | 12/2011 | Hasegawa |
| 8,124,306 | B2 | 2/2012 | Hirata |
| 8,227,162 | B2 | 7/2012 | Sano |
| 8,426,091 | B2 | 4/2013 | Magome |
| 8,426,094 | B2 | 4/2013 | Magome |
| 8,501,377 | B2 | 8/2013 | Takahashi |
| 8,512,925 | B2 | 8/2013 | Moribe |
| 8,518,620 | B2 | 8/2013 | Dojo |
| 8,614,044 | B2 | 12/2013 | Matsui |
| 8,778,585 | B2 | 7/2014 | Matsui |
| 8,841,054 | B2 | 9/2014 | Dojo |
| 9,046,800 | B2 | 6/2015 | Hotta |
| 9,097,998 | B2 | 8/2015 | Yamazaki |
| 9,128,400 | B2 | 9/2015 | Takahashi |
| 9,152,065 | B2 | 10/2015 | Sano |
| 9,152,088 | B1 | 10/2015 | Kobori |
| 9,158,217 | B2 | 10/2015 | Takahashi |
| 9,229,345 | B2 | 1/2016 | Ikeda |
| 9,235,151 | B2 | 1/2016 | Tanaka |

(Continued)

FOREIGN PATENT DOCUMENTS

| | | | |
|---|---|---|---|
| EP | 2 799 929 | A1 | 11/2014 |
| EP | 2 853 945 | A1 | 4/2015 |

(Continued)

OTHER PUBLICATIONS

Hirokatsu, Machine Translation of JP2007-176747A, Jul. 12, 2007 (Year: 2007).*
U.S. Appl. No. 18/173,255, Takayuki Toyoda, filed Feb. 23, 2023.
U.S. Appl. No. 18/307,826, Ryuichiro Matsuo, filed Apr. 27, 2023.
U.S. Appl. No. 18/307,827, Shin Kitamura, filed Apr. 27, 2023.
U.S. Appl. No. 18/307,828, Daisuke Tsujimoto, filed Apr. 27, 2023.
U.S. Appl. No. 18/307,829, Kazuyuki Sato, filed Apr. 27, 2023.

(Continued)

*Primary Examiner* — Peter L Vajda
*Assistant Examiner* — Jenna Kuipers
(74) *Attorney, Agent, or Firm* — VENABLE LLP

(57) ABSTRACT

A toner comprising a toner particle comprising a magnetic body, and a silica fine particle on a surface of the toner particle, wherein fragment ions corresponding to a D unit structure are observed in a specific measurement; when the silica fine particle is dispersed in a mixed solution of ethanol and aqueous solution of NaCl, followed by a titration operation using sodium hydroxide, a titer is within a specific range; in a chemical shift obtained by a specific measurement, with D as an area of a peak having a peak top present in a range from −25 to −15 ppm, and with D1 as an area of a peak having a peak top present in a range of more than −19 ppm and −17 ppm or less, D and D1 are in a specific ratio; and the magnetic body is present on the surface of the toner particle.

13 Claims, No Drawings

(56) References Cited

U.S. PATENT DOCUMENTS

| | | | |
|---|---|---|---|
| 9,348,253 B2 | 5/2016 | Kanno | |
| 9,372,420 B2 | 6/2016 | Mizo | |
| 9,377,708 B2 | 6/2016 | Magome | |
| 9,417,540 B2 | 8/2016 | Hashimoto | |
| 9,423,708 B2 | 8/2016 | Tominaga et al. | |
| 9,436,112 B2 | 9/2016 | Iwasaki | |
| 9,454,094 B2 | 9/2016 | Tsujimoto | |
| 9,551,947 B2 | 1/2017 | Hiroko | |
| 9,606,466 B2 | 3/2017 | Takahashi | |
| 9,651,883 B2 | 5/2017 | Hama | |
| 9,665,021 B2 | 5/2017 | Ohtsu | |
| 9,665,023 B2 | 5/2017 | Kamae | |
| 9,665,026 B2 | 5/2017 | Iwasaki | |
| 9,671,707 B2 | 6/2017 | Minagawa | |
| 9,703,216 B2 | 7/2017 | Tsuchida | |
| 9,785,068 B2 | 10/2017 | Umeda | |
| 9,804,514 B2 | 10/2017 | Suzumura | |
| 9,804,519 B2 | 10/2017 | Suzumura | |
| 9,829,816 B2 | 11/2017 | Tanaka | |
| 9,841,692 B2 | 12/2017 | Hasegawa | |
| 9,880,478 B2 | 1/2018 | Shimano | |
| 9,897,934 B2 | 2/2018 | Tamura | |
| 9,915,885 B2 | 3/2018 | Katsumata | |
| 9,927,728 B2 | 3/2018 | Arimura | |
| 9,946,179 B2 | 4/2018 | Arimura | |
| 9,946,181 B2 | 4/2018 | Hasegawa | |
| 9,964,874 B2 | 5/2018 | Suzumura | |
| 9,964,881 B2 | 5/2018 | Ikejiri | |
| 9,969,834 B2 | 5/2018 | Ohtsu | |
| 9,971,262 B2 | 5/2018 | Hasegawa | |
| 9,971,264 B2 | 5/2018 | Sano | |
| 10,012,918 B2 | 7/2018 | Ishigami | |
| 10,012,920 B2 | 7/2018 | Shibata | |
| 10,012,921 B2 | 7/2018 | Kamae | |
| 10,012,923 B2 | 7/2018 | Sano | |
| 10,036,970 B2 | 7/2018 | Kanno | |
| 10,078,281 B2 | 9/2018 | Ida | |
| 10,082,743 B2 | 9/2018 | Hama | |
| 10,088,765 B2 | 10/2018 | Miyakai | |
| 10,114,303 B2 | 10/2018 | Katsura | |
| 10,133,201 B2 | 11/2018 | Kamae | |
| 10,146,146 B2 | 12/2018 | Komatsu | |
| 10,151,990 B2 | 12/2018 | Suzuki | |
| 10,175,595 B2 | 1/2019 | Onozaki | |
| 10,197,936 B2 | 2/2019 | Onozaki | |
| 10,203,619 B2 | 2/2019 | Yamashita | |
| 10,216,108 B2 | 2/2019 | Iwasaki | |
| 10,228,627 B2 | 3/2019 | Nagashima | |
| 10,228,629 B2 | 3/2019 | Tamura | |
| 10,234,777 B2 | 3/2019 | Ohtsu | |
| 10,295,920 B2 | 5/2019 | Nishikawa | |
| 10,303,075 B2 | 5/2019 | Tanaka | |
| 10,310,397 B2 | 6/2019 | Sano | |
| 10,353,312 B2 | 7/2019 | Kamae | |
| 10,401,748 B2 | 9/2019 | Hashimoto | |
| 10,423,090 B2 | 9/2019 | Ohtsu | |
| 10,451,985 B2 | 10/2019 | Takahashi | |
| 10,451,986 B2 | 10/2019 | Sano | |
| 10,451,990 B2 | 10/2019 | Kamae | |
| 10,474,049 B2 | 11/2019 | Onozaki | |
| 10,514,624 B2 | 12/2019 | Tamura | |
| 10,545,420 B2 | 1/2020 | Kinumatsu | |
| 10,551,759 B2 | 2/2020 | Watanabe | |
| 10,564,560 B2 | 2/2020 | Onozaki et al. | |
| 10,642,178 B2 | 5/2020 | Yamashita | |
| 10,698,327 B2 | 6/2020 | Nagashima | |
| 10,747,132 B2 | 8/2020 | Takahashi | |
| 10,768,543 B2 | 9/2020 | Tsujimoto | |
| 10,775,710 B1 | 9/2020 | Kamae | |
| 10,782,623 B2 * | 9/2020 | Yoshiba | G03G 9/09716 |
| 10,838,317 B2 | 11/2020 | Sugahara | |
| 10,859,935 B2 | 12/2020 | Ohtsu | |
| 10,859,936 B2 | 12/2020 | Sugahara | |
| 10,877,386 B2 | 12/2020 | Murayama | |
| 10,877,391 B2 | 12/2020 | Matsuo | |
| 10,935,902 B2 | 3/2021 | Kanno | |
| 10,955,765 B2 | 3/2021 | Onozaki | |
| 10,969,704 B2 | 4/2021 | Kagawa | |
| 11,079,695 B2 | 8/2021 | Sato | |
| 11,099,493 B2 | 8/2021 | Komiya | |
| 11,112,709 B2 | 9/2021 | Saeki | |
| 11,112,713 B2 | 9/2021 | Akiyama | |
| 11,131,938 B2 | 9/2021 | Murayama | |
| 11,181,844 B2 | 11/2021 | Nagaoka | |
| 11,249,410 B2 | 2/2022 | Takahashi | |
| 11,415,902 B2 | 8/2022 | Watanabe | |
| 11,429,032 B2 | 8/2022 | Shibata | |
| 11,448,980 B2 | 9/2022 | Matsui | |
| 11,531,284 B2 | 12/2022 | Iguchi et al. | |
| 11,698,594 B2 | 7/2023 | Takahashi | |
| 2003/0031946 A1 * | 2/2003 | Sugiura | G03G 9/09716 430/108.7 |
| 2006/0067867 A1 | 3/2006 | Ishibashi et al. | |
| 2010/0273103 A1 | 10/2010 | Baba et al. | |
| 2011/0311910 A1 | 12/2011 | Matsui et al. | |
| 2012/0107741 A1 | 5/2012 | Hiraoka et al. | |
| 2013/0296578 A1 | 11/2013 | Amano et al. | |
| 2014/0377696 A1 | 12/2014 | Hasegawa et al. | |
| 2015/0185644 A1 | 7/2015 | Matsui | |
| 2015/0378274 A1 | 12/2015 | Abe et al. | |
| 2018/0074421 A1 | 3/2018 | Uchino | |
| 2018/0246430 A1 * | 8/2018 | Tanaka | G03G 9/0819 |
| 2019/0113858 A1 | 4/2019 | Kamae et al. | |
| 2019/0137902 A1 | 5/2019 | Shibata | |
| 2021/0055668 A1 | 2/2021 | Tamura | |
| 2021/0255557 A1 | 8/2021 | Watanabe | |
| 2021/0286282 A1 | 9/2021 | Kobori | |
| 2021/0302853 A1 | 9/2021 | Murata | |
| 2021/0302854 A1 | 9/2021 | Kitamura | |
| 2021/0302855 A1 | 9/2021 | Torii | |
| 2021/0302856 A1 | 9/2021 | Nagashima | |
| 2021/0397106 A1 | 12/2021 | Kobori | |
| 2022/0026822 A1 | 1/2022 | Sato | |
| 2022/0026823 A1 | 1/2022 | Sano | |
| 2022/0050398 A1 | 2/2022 | Ooyama | |
| 2022/0128916 A1 | 4/2022 | Yoshida | |
| 2022/0171302 A1 | 6/2022 | Sato | |
| 2022/0171303 A1 | 6/2022 | Hiramatsu | |
| 2022/0252995 A1 | 8/2022 | Tsujimoto | |
| 2022/0326633 A1 | 10/2022 | Aoki | |
| 2022/0373906 A1 | 11/2022 | Ohmori | |
| 2022/0373911 A1 | 11/2022 | Kamae | |
| 2022/0373919 A1 | 11/2022 | Imura | |
| 2023/0014130 A1 | 1/2023 | Sano | |
| 2023/0122974 A1 | 4/2023 | Kagawa | |
| 2023/0152725 A1 | 5/2023 | Ochi | |
| 2023/0408946 A1 | 12/2023 | Sato et al. | |

FOREIGN PATENT DOCUMENTS

| | | | |
|---|---|---|---|
| JP | 7-330324 A | | 12/1995 |
| JP | 9-204065 A | | 8/1997 |
| JP | 11-174727 A | | 7/1999 |
| JP | 2000-147831 A | | 5/2000 |
| JP | 2002-23413 A | | 1/2002 |
| JP | 2002-139862 A | | 5/2002 |
| JP | 2002-182423 A | | 6/2002 |
| JP | 2002-256173 A | | 9/2002 |
| JP | 2004-126249 A | | 4/2004 |
| JP | 2004-126251 A | | 4/2004 |
| JP | 2007-114630 | | 5/2007 |
| JP | 2007-176747 | | 7/2007 |
| JP | 2007176747 A | * | 7/2007 |
| JP | 2008-145490 | | 6/2008 |
| JP | 2009-31426 | | 2/2009 |
| JP | 2009-271394 | | 11/2009 |
| JP | 2009-276643 A | | 11/2009 |
| JP | 2012-236752 A | | 12/2012 |
| JP | 2015-11070 A | | 1/2015 |
| JP | 2016-66049 A | | 4/2016 |
| JP | 2016-167029 | | 9/2016 |
| JP | 2019-3082 A | | 1/2019 |
| JP | 2019-86705 | | 6/2019 |
| JP | 2019-109416 A | | 7/2019 |

(56) References Cited

FOREIGN PATENT DOCUMENTS

| | | | |
|---|---|---|---|
| JP | 2020-91471 | A | 6/2020 |
| JP | 2020-95081 | A | 6/2020 |
| JP | 2020-154294 | | 9/2020 |
| JP | 2021-148999 | A | 9/2021 |
| WO | 2004060803 | A1 | 7/2004 |

OTHER PUBLICATIONS

U.S. Appl. No. 18/307,832, Shohei Shibahara, filed Apr. 27, 2023.

ECHA REACH Registration Dossier, https://echa.europa.eu/registration-dossier/-/registered-dossier/15289/4/13.

* cited by examiner

TONER

BACKGROUND OF THE INVENTION

Field of the Invention

The present disclosure relates to a toner used in image-forming methods such as electrophotographic methods.

Description of the Related Art

Recent years have witnessed ongoing diversification in the usage goals and usage environments, as well as further demands in terms of longer lives and smaller sizes, in image forming apparatuses such as copiers and printers. In order to achieve longer lives and smaller sizes it is necessary to reduce toner consumption. Reducing the amount of toner that is consumed allows herein for long-term image formation with little toner. Improving toner transferability is an important factor in terms of reducing toner consumption.

A toner particle having a magnetic body on the surface, as in a kneaded and pulverized toner particle containing a magnetic body, has a component of low electrical resistance on the toner surface; as a result the charge quantity of the toner is readily lessened and made uniform as a result. As a result, excessive charging and improper charging are suppressed, even upon application of large transfer bias, and as a result it becomes possible to suppress electrostatic adhesion to a photosensitive member, and achieving good transferability. However, a toner containing a toner particle having a magnetic body on the surface is prone to exhibit poorer developing performance, with ensuing drops in image density, after long-term standing in a high-temperature, high-humidity environment.

In this regard, a technique has been disclosed (Japanese Patent Application Publication No. 2016-167029) that involves using an external additive in the form of silica particles having been surface-treated with a given or greater amount of a cyclic siloxane, to thereby improve the image density of a kneaded and pulverized toner containing a magnetic body.

Also, a technique has been disclosed (Japanese Patent Application Publication No. 2007-176747) pertaining to surface-coated silica particles and that are that hold a certain amount of free silicone oil, obtained as a result of a coating treatment with two or more kinds of silicone oils as external additives.

SUMMARY OF THE INVENTION

However, it has been found that the treatment methods and the treatment amounts of cyclic siloxane and silicone oil in the silica particles used in Japanese Patent Application Publication Nos. 2016-167029 and 2007-176747 are not appropriate, and the effect of improving developing performance when applying such silica particles to a toner is accordingly weak. Specifically, it has been found that room for improvement remains in terms of improving developing performance in a high-temperature, high-humidity environment, in toners that contain a toner particle having a magnetic body on the surface.

The present disclosure provides a toner having excellent developing performance, also as a toner containing a toner particle having a magnetic body on the surface, and that affords high image density also upon long-term standing in a high-temperature, high-humidity environment.

The present invention relates to a toner comprising
a toner particle comprising a magnetic body, and
a silica fine particle on a surface of the toner particle,
wherein fragment ions corresponding to a structure represented by Formula (1) are observed in a measurement of the silica fine particle by time-of-flight secondary ion mass spectrometry;

(1)

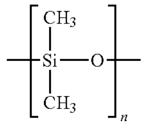

in Formula (1), n represents an integer of 1 or more;
when 2.00 g of the silica fine particle is dispersed in a mixed solution of 25.0 g of ethanol and 75.0 g of a 20 mass % aqueous solution of NaCl, followed by a titration operation using sodium hydroxide,
Sn defined by Formula (10) satisfies Formula (2);

$$0.05 \leq Sn \leq 0.20 \qquad (2):$$

$$Sn=\{(a-b)\times c\times NA\}/(d\times e) \qquad (10):$$

in Formula (10),
a is a NaOH titer (L) required to adjust to 9.0 a pH of the mixed solution in which the silica fine particle has been dispersed,
b is a NaOH titer (L) required to adjust to 9.0 a pH of the mixed solution of 25.0 g of ethanol and 75.0 g of a 20 mass % aqueous solution of NaCl,
c is a concentration (mol/L) of the NaOH solution used for titration,
NA is Avogadro's number,
d is a mass (g) of the silica fine particle, and
e is a BET specific surface area ($nm^2/g$) of the silica fine particle;
in a chemical shift obtained by solid-state $^{29}$Si-NMR DD/MAS of the silica fine particle, with D denoting an area of a peak having a peak top present in a range from −25 to −15 ppm, S denoting the sum total of areas of peaks of an M unit, a D unit, a T unit and a Q unit present in a range from −140 to 100 ppm, and B ($m^2/g$) denoting a specific surface area of the silica fine particle,
a value (D/S)/B of a ratio of (D/S) relative to B is $5.7\times10^{-4}$ to $56\times10^{-4}$;
(D/S)/B measured after washing of the silica fine particle with chloroform is $1.7\times10^{-4}$ to $56\times10^{-4}$;
with D1 as an area of a peak having a peak top present in a range of more than −19 ppm and −17 ppm or less, in the chemical shift, a value (D1/D) of a ratio of D1 relative to D is 0.10 to 0.30; and
the magnetic body is present on the surface of the toner particle.

A toner can be thus provided that has excellent developing performance, also as a toner containing a toner particle having a magnetic body on the surface, and that affords high image density also upon long-term standing in a high-temperature, high-humidity environment. Further features of the present invention will become apparent from the following description of exemplary embodiments.

DESCRIPTION OF THE EMBODIMENTS

In the present disclosure, the terms "from XX to YY" and "XX to YY", which indicate numerical ranges, mean numerical ranges that include the lower limits and upper limits that are the end points of the ranges. In cases where numerical ranges are indicated incrementally, upper limits and lower limits of the numerical ranges can be arbitrarily combined. The term "monomer unit" describes a reacted form of a monomeric material in a polymer.

As described above, a toner containing a toner particle having a magnetic body on the surface exhibits excellent transferability, but tends to exhibit impaired developing performance when allowed to stand in a high-temperature, high-humidity environment. This is deemed to arise from the fact that the presence of a magnetic body with low electrical resistance on the surface of the toner particle facilitates outflow of toner charge to the exterior. Charge leakage becomes excessive when such atoner is allowed to stand in a high-temperature, high-humidity environment where the influence of moisture is significant. It is deemed that, as a result, the charge required for development is insufficient.

Therefore, the inventors have studied a toner exhibiting high charge retention while containing a toner particle having a magnetic body on the surface. As a result of diligent research, the inventors have found that the above effect can be elicited by designing, in the below-described manner, a silica fine particle that is combined with the toner.

An explanation follows next on the silica fine particle of the present disclosure.

The inventors focused first on the surface of the silica fine particle. The surface of the silica fine particle has hydroxy groups (OH groups) i.e. silanol groups included in the silanol structure, and hence the surface of the particles is hydrophilic. Therefore, the surface of the silica fine particle readily adsorbs moisture in the air. As a result, the electrical resistance of silica decreases with moisture adsorption, particularly in a high-temperature, high-humidity environment; in turn, this promotes drops in charge retention in a toner that contains a toner particle having a magnetic body present on the surface.

However, the silanol amount cannot be wholly controlled simply by increasing the surface treatment amount on a silica fine particle base for the purpose of reducing the amount of surface silanol groups of the silica fine particle, and thus no improvement in charge retention in a high-temperature, high-humidity environment is observed. The flowability of the toner likewise decreases, and not only does the charge rising performance decrease, but also an adverse effect arises in the form of melt adhesion to the inner members of a toner cartridge.

It is deemed that high charge rising performance is required, in addition to charge retention, in order to obtain high image density upon long-term standing in a high-temperature, high-humidity environment. These characteristics need therefore to be achieved simultaneously.

The inventors have assiduously studied a silica fine particle that allows improving charge retention and of charge rising performance in toners containing a toner particle having a magnetic body on the surface. The inventors found, as a result, that the toner below is effective in that respect.

The present invention relates to a toner comprising a toner particle comprising a magnetic body, and a silica fine particle on a surface of the toner particle, wherein fragment ions corresponding to a structure represented by Formula (1) are observed in a measurement of the silica fine particle by time-of-flight secondary ion mass spectrometry;

(1)

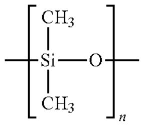

in Formula (1), n represents an integer of 1 or more;

when 2.00 g of the silica fine particle is dispersed in a mixed solution of 25.0 g of ethanol and 75.0 g of a 20 mass % aqueous solution of NaCl, followed by a titration operation using sodium hydroxide, Sn defined by Formula (10) satisfies Formula (2);

$$0.05 \leq Sn \leq 0.20 \quad (2):$$

$$Sn = \{(a-b) \times c \times NA\}/(d \times e) \quad (10):$$

in Formula (10), a is a NaOH titer (L) required to adjust to 9.0 a pH of the mixed solution in which the silica fine particle has been dispersed, b is a NaOH titer (L) required to adjust to 9.0 a pH of the mixed solution of 25.0 g of ethanol and 75.0 g of a 20 mass % aqueous solution of NaCl, c is a concentration (mol/L) of the NaOH solution used for titration, NA is Avogadro's number, d is a mass (g) of the silica fine particle, and e is a BET specific surface area ($nm^2/g$) of the silica fine particle;

in a chemical shift obtained by solid-state $^{29}$Si-NMR DD/MAS of the silica fine particle, with D denoting an area of a peak having a peak top present in a range from −25 to −15 ppm, S denoting the sum total of areas of peaks of an M unit, a D unit, a T unit and a Q unit present in a range from −140 to 100 ppm, and B ($m^2/g$) denoting a specific surface area of the silica fine particle, a value (D/S)/B of a ratio of (D/S) relative to B is $5.7 \times 10^{-4}$ to $56 \times 10^{-4}$;

(D/S)/B measured after washing of the silica fine particle with chloroform is $1.7 \times 10^{-4}$ to $56 \times 10^{-4}$; with D1 as an area of a peak having a peak top present in a range of more than −19 ppm and −17 ppm or less, in the chemical shift, a value (D1/D) of a ratio of D1 relative to D is 0.10 to 0.30; and the magnetic body is present on the surface of the toner particle.

An explanation follows next on the reasons why excellent charge retention is achieved, even in a toner that comprises a toner particle having a magnetic body present on the surface, by controlling a surface treatment state of the silica fine particle (Formula (2), (D/S)/B and D1/D).

Fragment ions corresponding to a structure represented by Formula (1) must be observed in a measurement of the silica fine particle by time-of-flight secondary ion mass spectrometry TOF-SIMS. When fragment ions represented by Formula (1) are observed, this signifies that the silica fine particle has been surface-treated with a surface treatment agent having a polydimethylsiloxane structure.

Polydimethylsiloxane is hydrophobic; thus a surface treatment with a treatment agent having a polydimethylsiloxane structure allows preventing the silica fine particle from adsorbing water, into the toner, in a high-temperature, high-humidity environment.

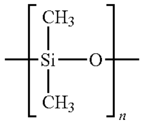

(1)

In Formula (1), n is an integer of 1 or more (preferably from 1 to 500, more preferably from 1 to 200, yet more preferably from 1 to 100, and still more preferably from 1 to 80).

Herein TOF-SIMS is a method for analyzing the composition of a sample surface by irradiating a sample with ions, and analyzing the mass of secondary ions emitted from the sample. Secondary ions are emitted from a region several nanometers deep from the sample surface, which therefore allows analyzing the structure near the surface of the silica fine particle. The mass spectrum of secondary ions obtained as a result of the measurement corresponds to fragment ions that reflect the molecular structure of the surface treatment agent of the silica fine particle.

Fragment ions corresponding to the structure represented by Formula (1) in the silica fine particle is observed in a measurement by TOF-SIMS. A structural unit having such a structure is defined as a D unit in the present disclosure. If fragment ions of a D unit are observed by TOF-SIMS, this signifies that the silica fine particle has been surface-treated with a surface treatment agent containing a D unit.

In a case where the silica fine particle is dispersed in a solvent and a titration operation is performed using sodium hydroxide, the amount of sodium hydroxide required to adjust the pH to a target value is determined by the amount of silanol groups on the surface of a silica substrate and the amount of silanol groups in the surface treatment structure of the silica. That is, the amount of Si—OH groups can be evaluated on the basis of the value Sn (groups/$nm^2$) worked out from the titer of sodium hydroxide. This is because the Si—OH of the substrate of the silica fine particle and the Si—OH groups derived from the surface treatment agent give rise to a neutralization reaction with sodium hydroxide.

Moreover, silanol groups are polar, and hence it is deemed that the charging performance of the silica fine particle is controlled by the content of silanol groups. The charge rising performance worsens if the content of silanol groups is low, while charge retention is readily impaired when the content of silanol groups is excessive. Among the silanol groups, those on the surface of the silica fine particle base readily adsorb moisture, and accordingly are deemed to contribute particularly to impairment of charge retention.

Specifically, when 2.00 g of the silica fine particle is dispersed in a mixed solution of 25.0 g of ethanol and 75.0 g of a 20 mass % aqueous solution of NaCl, followed by a titration operation using sodium hydroxide, Sn defined by Formula (10) must satisfy the Formula (2) below:

$$0.05 \leq Sn \leq 0.20 \quad (2):$$

$$Sn = \{(a-b) \times c \times NA\}/(d \times e) \quad (10):$$

in Formula (10), a is a NaOH titer (L) required to adjust to 9.0 a pH of the above mixed solution in which the silica fine particle has been dispersed;

b is a NaOH titer (L) required to adjust to 9.0 a pH of the mixed solution of 25.0 g of ethanol and 75.0 g of a 20 mass % aqueous solution of NaCl;

c is a concentration (mol/L) of the NaOH solution used for titration;

NA is Avogadro's number;

d is a mass (g) of the silica fine particle; and e is a BET specific surface area ($nm^2$/g) of the silica fine particle.

When Sn satisfies Formula (2), this signifies that the amount of silanol groups on the surface of the silica fine particle base and the amount of silanol groups in the surface treatment structure of the silica fine particle is appropriate. The charge retention and charge rising performance of the toner are improved as a result. Herein Sn is preferably from 0.05 to 0.25, more preferably from 0.08 to 0.19, and yet more preferably from 0.10 to 0.18.

The value of Sn can be increased by performing a treatment under conditions such that no reaction of the surface treatment agent proceeds, or by only adding the treatment agent in an amount such that the surface of the silica fine particle base is not completely covered, so that silanol groups remain onto the surface of the silica fine particle base. By contrast, the value of Sn can be reduced by treating the silica fine particle to thereby reduce the number of silanol groups on the surface of the silica fine particle, or by performing the treatment using a surface treatment agent that has no silanol groups. It is also effective to extend the reaction time, or to raise the temperature, during the surface treatment.

As Si—OR group control, it is also necessary herein to control the surface treatment state ((D/S)/B and D1/D) of the silica fine particle. The surface treatment state of the silica fine particle is calculated in accordance with a solid-state $^{29}$Si-NMR DD/MAS method. Quantitative information on the chemical bonding state of the Si atoms in the silica fine particle can be obtained in a DD/MAS measurement method, since in that case all Si atoms in the measurement sample are observed.

Generally, in solid-state $^{29}$Si-NMR, to a Si atom in a solid sample, four types of peaks, namely, an M unit (formula (4)), a D unit (formula (5)), a T unit (formula (6)), and a Q unit (formula (7)), can be observed.

$$\text{M unit: } (R_i)(R_j)(R_k)SiO_{1/2} \quad (4)$$

$$\text{D unit: } (R_g)(R_h)Si(O_{1/2})_2 \quad (5)$$

$$\text{T unit: } R_mSi(O_{1/2})_3 \quad (6)$$

$$\text{Q unit: } Si(O_{1/2})_4 \quad (7)$$

$R_i$, $R_j$, $R_k$, $R_g$, $R_h$, and $R_m$ in the formulas (4), (5), and (6) are each an alkyl group such as a hydrocarbon group having from 1 to 6 carbon atoms, a halogen atom, a hydroxy group, an acetoxy group, an alkoxy group, or the like bonded to silicon.

When a silica fine particle is measured by DD/MAS, the Q unit indicates a peak corresponding to Si atoms in the silica fine particle base before surface treatment. In the present disclosure, when a silica fine particle is surface-treated with a surface treatment agent such as silicone oil, the silica fine particle is assumed to include the portion derived from the surface treatment agent. In addition, a silica fine particle before being surface-treated is also referred to as a silica fine particle base. The M unit, D unit, and T unit each show a peak corresponding to the structure of the surface treatment agent for silica fine particles represented by the above formulas (4) to (6).

Each can be identified by the chemical shift value of the solid-state $^{29}$Si-NMR spectrum, the chemical shift being from −130 ppm to −85 ppm for the Q unit, from −65 ppm to −51 ppm for the T unit, from −25 ppm to −15 ppm for the D unit, and from 10 to 25 ppm for the M unit, and each unit can be quantified by a respective integrated value. The respective peak integrated values are denoted by Q, T, D, and M, and the sum of these integrated values is denoted by S.

In a chemical shift obtained by solid-state $^{29}$Si-NMR DD/MAS of the silica fine particle, D denotes an area of a peak having a peak top present in a range from −25 to −15 ppm, and S denotes the sum total of areas of peaks of an M unit, a D unit, a T unit and a Q unit present in a range from −140 to 100 ppm. Herein (D/S)/B is $5.7\times10^{-4}$ to $56\times10^{-4}$ ($5.6\times10^{-3}$), where B ($m^2/g$) denotes a BET specific surface area of the silica fine particle after the surface treatment.

The parameter (D/S)/B signifies the Si atomic mass per unit surface area constituting the D unit, relative to the Si atomic mass of the totality of the silica fine particle. Herein a silica fine particle for which fragments represented by Formula (1) are observed in TOF-SIMS and that exhibit a D unit peak in a solid-state $^{29}$Si-NMR proves thus to be a silica fine particle having undergone a surface treatment by a compound having a dimethylsiloxane structure.

That is, the parameter (D/S)/B represents the amount of dimethylsiloxane on the surface of the silica fine particle per unit surface area. The lower the (D/S)/B ratio, the smaller is the amount of dimethylsiloxane on the surface of the silica fine particle, and although the flowability of the silica fine particle as an external additive is not hindered thereby, the improvement in charge retention is nevertheless small, since the influence of moisture in a high-temperature, high-humidity environment cannot be suppressed due to the fact that silanol groups are prone to remain on the silica substrate surface.

Conversely, the higher the (D/S)/B ratio, the greater is the amount of dimethylsiloxane on the surface of the silica fine particle, however, charging performance tends to drop on account of hindered flowability of the silica fine particle, as an external additive, when the presence of the D unit is excessive. In a case where the dimethylsiloxane treatment state is not uniform, moreover, silanol groups remain on the surface of the silica fine particle base, and as a result charging performance readily worsens, in particular in a high-temperature, high-humidity environment, when the number of prints is large.

Therefore, (D/S)/B must be from $5.7\times10^{-4}$ to $56\times10^{-4}$. When (D/S)/B is lower than $5.7\times10^{-4}$, the dimethylsiloxane treatment is insufficient, and charge retention of the toner in a high-temperature, high-humidity environment is significantly impaired. When by contrast (D/S)/B exceeds $56\times10^{-4}$, the amount of dimethylsiloxane becomes excessive, and the flowability of the toner decreases significantly. Thus (D/S)/B is preferably from $5.7\times10^{-4}$ to $49\times10^{-4}$, and more preferably from $7.1\times10^{-4}$ to $49\times10^{-4}$.

The value of (D/S)/B can be raised by increasing the amount of the surface treatment agent at the time of the surface treatment of the silica fine particle base, or by using a surface treatment agent containing a large amount of a component having a polydimethylsiloxane structure. By contrast, the value of (D/S)/B can be lowered by reducing the amount of the surface treatment agent at the time of the surface treatment of the silica fine particle base, or by using a surface treatment agent that does not contain a large amount of a component having a polydimethylsiloxane structure.

As a result, the silica fine particle is surface-treated with an appropriate amount of the D unit, and the amount of silanol on the surface of the silica fine particle is controlled so as to lie within an appropriate range.

The value of (D/S)/B measured after washing of the silica fine particle with chloroform must be from $1.7\times10^{-4}$ to $56\times10^{-4}$. A washing operation removes physically adsorbed surface treatment agent, while leaving the chemically bonded surface treatment agent. Therefore, the value of (D/S)/B after washing denotes the amount of chemically bonded D unit. When (D/S)/B is lower than $1.7\times10^{-4}$, the amount of the surface treatment agent adhered to the surface of the silica fine particle is insufficient. As a result, the surface treatment agent of the silica fine particle sloughs off with long-term use, and thus it is no longer possible to prevent adsorption of moisture in a high-temperature, high-humidity environment. When (D/S)/B is higher than $56\times10^{-4}$, the toner tends to exhibit worsened flowability, which translates into poorer charging performance.

The value of (D/S)/B after washing of the silica fine particle with chloroform is preferably from $2.5\times10^{-4}$ to $45\times10^{-4}$, and more preferably from $3.5\times10^{-4}$ to $40\times10^{-4}$.

Herein D1 is defined as a polar group at a terminus of a structure, in the silica fine particle, derived from the surface treatment agent. Specifically, D1 corresponds to a peak having a peak top present in the range of more than −19 ppm and −17 ppm or less, in a chemical shift obtained in the below-described solid-state $^{29}$Si-NMR. In the silica fine particle treated with a D unit, D1 denotes a polar group at a terminus of the D unit, and has the structure represented by Formula (8) below.

$$\text{D1: —Si—OR}^3 \qquad (8)$$

($R^3$ in Formula (8) is a methyl group, an ethyl group or a hydrogen atom)

Diligent research by the inventors has revealed that by virtue of the fact that the silica fine particle has an appropriate amount of polar groups at the terminus of the D units, both charge retention and charge rising performance are improved in a toner containing a toner particle having a magnetic body present on the surface.

The inventors speculate the following concerning the effect of a polar group at a terminus of the D unit. The polar group of D1 at the terminus of the D unit is moderately more hydrophobic than the polar group, such as a silanol group, of the Q unit that is present on the surface of the silica fine particle base. This arises presumably from the influence of hydrophobicity derived from carbon atoms bonded to the Si, to which the polar group is bonded in turn.

The polar group at the terminus of the D unit, which has moderately high hydrophobicity, elicits the effect of imparting charging performance to the terminus of the hydrophobic group, and enhancing thus charge rising performance. In addition, the silica fine particle is little affected by moisture, and thus good charge retention can be readily maintained, by virtue of the fact that the polar group D1 at the terminus of the D unit is more hydrophobic than the silanol groups present on the surface of the silica fine particle base.

As represented by (D/S)/B after washing with chloroform, moreover the D unit is bonded to the silica fine particle base to a certain extent, and D1 at the terminus of the D unit is present at a position spaced from the surface of the silica fine particle base. Therefore, the Si—OH group of D1 better suppresses the influence of moisture on the silica fine particle base, and allows good charge retention to be more readily maintained, than do the silanol groups present on the surface of the silica fine particle base.

Such being the case, the surface of the silica fine particle is treated with a treatment agent having a D unit, to control the amount of silanol groups on the surface of the silica fine particle to an appropriate amount, and to introduce a certain amount of D1 into the terminus of the D unit. That is, the amount of silanol groups in the silica fine particle, (D/S)/B, and also (D/S)/B and D1/D after washing with chloroform, are adjusted to appropriate ranges. It is deemed that by satisfying the foregoing a toner can be provided that is excellent in charge retention, charge rising performance and flowability, also in a high-temperature, high-humidity environment.

Therefore, D1 is defined as the surface area of a peak having a peak top present in the range of more than −19 ppm and −17 ppm or less in the chemical shift obtained by solid-state $^{29}$Si-NMR DD/MAS of the silica fine particle. The value of the ratio (D1/D) of D1 relative to D must be from 0.09 to 0.32.

When D1/D is lower than 0.09, the amount of polar groups is small, and charge rising performance is insufficient. When D1/D exceeds 0.32, the amount of polar groups is large, and hence charging performance drops on account of the influence of moisture in a high-temperature, high-humidity environment. Thus D1/D is preferably from 0.10 to 0.30, more preferably from 0.11 to 0.30, yet preferably from 0.15 to 0.25.

Herein D1/D can be raised by increasing the content ratio of silanol or a cyclic siloxane in the treatment agent component used in the surface treatment of the silica fine particle base. Conversely, D1/D can be reduced by lowering the content ratio of silanol or cyclic siloxane in the components of the treatment agent used for surface treatment of the silica fine particle base.

Upon separation of the peak of the D unit obtained by solid-state $^{29}$Si-NMR DD/MAS into two, D1 is defined as the area of the peak having peak top present in the range of chemical shift of more than −19 ppm and −17 ppm or less, and D2 is defined as the area of a peak having a peak top present in the range from −23 to −19 ppm.

As is known, Si atoms bonded to OR groups at the terminus of the D unit measured in the silica fine particle correspond to a peak D1. It is further known that Si atoms in a dimethylsiloxane chain correspond to a peak D2. That is, it can be concluded that the larger the integrated value of the peak D1, the greater is the amount of polar groups in the terminus of the D unit. That is, D1/D denotes the amount of polar groups in the D unit of the treatment agent. It can thus be concluded that in the treatment state of the silica fine particle the higher the ratio D1/D, the greater is the number of polar groups at the terminus of the D unit.

The toner particle comprises a magnetic body, and the magnetic body is present on the surface of the toner particle. Herein with Sm (area %) as an abundance of the magnetic body on the surface of the toner particle, the Sm is preferably 1.0 to 7.0 area %. When the abundance of the magnetic body is lower than 1.0 area %, excessive or abnormal charging is prone to occur on account of transfer bias, and transferability drops. When the abundance of the magnetic body exceeds 7.0 area %, charge leakage readily occurs in a high-temperature, high-humidity environment.

The abundance (Sm) of the magnetic body is preferably from 1.2 to 6.9 area %, and more preferably from 2.0 to 6.0 area %. The abundance of the magnetic body can be controlled on the basis of the content of the magnetic body in the toner and the toner production conditions. The abundance of the magnetic body at the surface of the toner particle can be measured on the basis of a SEM observation described below.

The content of the magnetic body is preferably from 30 to 120 parts by mass relative to 100 parts by mass of the toner particle. If the content of the magnetic body lies within the above range, the abundance (Sm) of the magnetic body can be controlled to lie within a desired range. When by contrast the content of the magnetic body is lower than 30 parts by mass, the magnetic force of toner becomes insufficient, and attracting forces towards the developer carrier having magnetism, in one-component contact-less developing systems, become weaker. Fogging is increased as a result. Low-temperature fixing performance decreases when the content of the magnetic body exceeds 120 parts by mass.

The content of the magnetic body is more preferably from 40 to 110 parts by mass, and yet preferably from 60 to 100 parts by mass.

The content of the magnetic body can be measured in accordance with a below-described method that involves dissolving a toner particle in chloroform, and recovering the magnetic body using a magnet.

With Ssi (area %) as a coverage ratio of a surface of a toner particle by the silica fine particle, calculated on the basis of an observation image of the surface of the toner using a scanning electron microscope, the Ssi is preferably 30 to 90 area %. If the coverage ratio is 30 area % or more, the magnetic body present on the surface of the toner particle is protected, and good charging performance and flowability are achieved. When the coverage ratio is 90 area % or less, a sufficient amount of heat is transferred from a fixing roller to the toner in a fixing step, and low-temperature fixing performance improves as a result.

Herein Ssi is preferably from 35 to 70 area %, more preferably from 40 to 60 area %, and yet more preferably from 45 to 55 area %.

Further, Ssi can be controlled on the basis of addition amount of the silica fine particle to the toner particle.

The value of the ratio (Sm/Ssi) of the abundance Sm of the magnetic body on the surface of the toner particle relative to the coverage ratio Ssi of the silica fine particle is preferably from 0.010 to 0.240. If Sm/Ssi lies within the above range, the magnetic body that is present on the surface of the toner particle is sufficiently coated with the silica fine particle, thanks to which the balance between charge retention and charge rising performance is improved. Further, Sm/Ssi is more preferably from 0.013 to 0.230, yet more preferably from 0.020 to 0.180, particularly preferably from 0.040 to 0.170, and especially preferably from 0.060 to 0.120.

The content of the silica fine particle is preferably from 0.3 to 2.2 parts by mass, more preferably from 0.4 to 2.0 parts by mass, and yet more preferably from 0.7 to 1.5 parts by mass, relative to 100 parts by mass of the toner particle. By setting the content of the silica fine particle within the above range, the coverage ratio of the toner particle with the silica fine particle can be controlled to lie within a desired range.

The number-average particle diameter of primary particle of the silica fine particle is preferably from 5 to 50 nm, more preferably from 10 to 40 nm, and yet more preferably 15 to 25 nm. Toner characteristics such as the charging performance and flowability of the toner are improved through external addition of a silica fine particle having a particle diameter within this range to the toner particle.

The silica fine particle preferably contain silica fine particle with a small particle diameter and silica fine particle with a large particle diameter. The number-average particle diameter of the primary particle of the small-diameter silica fine particle is preferably from 5 nm to 25 nm, more preferably from 10 nm to 20 nm. The number-average particle diameter of the primary particle of the large-diameter silica fine particle is preferably more than 25 nm and 50 nm or less, more preferably from 30 nm to 40 nm.

The BET specific surface area of the small-diameter silica fine particle is preferably from 100 $m^2/g$ to 500 $m^2/g$, more preferably from 150 $m^2/g$ to 300 $m^2/g$. Also, the BET specific surface area of the large-diameter silica fine particle is preferably from 10 $m^2/g$ to 100 $m^2/g$, more preferably from 30 $m^2/g$ to 80 $m^2/g$.

The mass-based content ratio of the small-diameter silica fine particle and the large-diameter silica fine particle is preferably from 20:1 to 5:1, more preferably from 15:1 to 7:1 (small-diameter silica fine particle:large-diameter silica fine particle).

The BET specific surface area B of the silica fine particle after surface treatment is preferably from 40 $m^2/g$ to 200 $m^2/g$, more preferably from 100 $m^2/g$ to 150 $m^2/g$.

It has been found that a toner having a small-diameter silica fine particle externally added thereto is in a state in which the small-diameter silica fine particle is embedded in the surface of the toner particle. This state is brought about for instance on account of stress with the carrier when the toner is used as a two-component developer, stress from a developing blade and a developing sleeve when the toner is used as a one-component developer, as well as collisions of the toner particle against the inner wall of a developing device, a toner stirring blade, and toner particles. In order to reduce embedding of the small-diameter silica fine particle it is effective to incorporate the small-diameter silica fine particle and the large-diameter silica fine particle as described above.

The large-diameter silica fine particle elicits an effect as a spacer particle, and as a result it becomes possible to prevent direct contact of the toner surface, having the small-diameter silica fine particle adhered thereto, to the carrier, the developing blade, the developing roller, the developing device inner wall, the toner stirring member, and other toner particles. Toner degradation and member contamination can be suppressed as a result.

Preferably, the small-diameter silica fine particle and the large-diameter silica fine particle are subjected to the same surface treatment, from the viewpoint of charging uniformity.

The number-average particle diameter of the silica fine particle can be controlled by modifying conditions in the production process of the silica fine particle, for instance in a classification step, and can be controlled by adjusting the mixing ratio of the small-diameter silica fine particle and the large-diameter silica fine particle, as well as the number-average particle diameters of the foregoing.

More preferably, the silica fine particle is surface-treated with at least a compound represented by Formula (3) below.

(3)

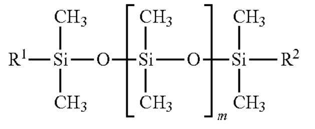

In Formula (3), $R^1$ and $R^2$ each independently represent a carbinol group, a hydroxy group, an epoxy group, a carboxy group, an alkyl group (preferably having 1 to 6 carbon atoms, and more preferably having 1 to 3 carbon atoms) or a hydrogen atom. Further, m is the average number of repeating units, and is an integer of 1 to 200 (preferably from 30 to 150, more preferably from 70 to 130).

The surface treatment agent of Formula (3) allows further improving charging stability in environments at yet higher temperature and humidity. The surface treatment agent that is used is not particularly limited, so long as it is a compound represented by Formula (3), and known surface treatment agents can be used. The foregoing may be used singly or in combinations of two or more types. Two or more types of surface treatment agents having different functional groups may be used sequentially or mixed with each other; alternatively, two or more types of surface treatment agents having the same functional groups but different viscosities and molecular weight distributions may be used sequentially or mixed with each other.

Whether or not a surface has been treated with the compound represented by Formula (3) can be determined in accordance with a method such as analysis of a mass spectrum obtained by gas-chromatography/mass spectrometry.

A carbon amount immobilization rate (C amount immobilization rate) upon washing of the silica fine particle with chloroform is preferably from 30 to 70%, more preferably from 50 to 70%, and yet more preferably from 60 to 65%.

The carbon contained in the silica fine particle is derived from carbon in the surface treatment agent, and can be controlled by modifying the structure of the surface treatment agent and treatment conditions (treatment temperature, treatment time, viscosity, addition amount and so forth). Herein, the carbon amount immobilization rate is considered to correspond to the amount of the surface treatment agent that is chemically bonded, or strongly physically bonded, to the silica substrate surface.

The coefficient of friction between the silica fine particle and members within a toner cartridge can be rendered appropriate by controlling the C amount immobilization rate by the surface treatment agent so as to lie in the above range. As a result it becomes possible to suppress melt adhesion of the silica fine particle, and of toner having had the silica fine particle externally added thereto, onto members within the toner cartridge; cleaning performance can thus be improved. In addition, the amount of silanol groups on the surface of the silica fine particle base is reduced, and thus D1/D can be readily controlled and overcharging in low-humidity environments can be suppressed yet more easily. Charging performance stability is further improved as a result.

In addition to the silica fine particle, the toner preferably comprises a strontium titanate fine particle on the surfaces of the toner particle. A value (Si/Sr) of an element intensity-basis ratio of a content of the silica fine particle relative to a content of the strontium titanate fine particle, on the basis of an X-ray fluorescence analysis of the toner, is preferably from 0.10 to 2.30, more preferably from 0.10 to 1.50 and yet more preferably from 0.10 to 0.80.

The presence of the strontium titanate fine particle on the surface of the toner particle has the effect of polishing and removing deposits on components inside the apparatus, which translates into better cleaning performance. The presence of an appropriate amount of the strontium titanate fine particle allows moreover improving charge retention.

Cleaning performance and charge retention both can be achieved by controlling the above Si/Sr ratio so as to lie in the above range. The content ratio of the silica fine particle and the strontium titanate fine particle is calculated on the basis of a ratio of the signal intensity of Si atoms and the signal intensity of Sr atoms in the strontium titanate fine particle, as obtained by X-ray fluorescence analysis of the toner. The measurement method involved in X-ray fluorescence analysis will be explained further on.

The ratio Si/Sr can be controlled for instance on the basis of the external addition amount of the silica fine particle or the strontium titanate fine particle.

The content of the strontium titanate fine particle is preferably from 0.01 to 0.75 parts by mass, more preferably from 0.03 to 0.71 parts by mass, yet more preferably from 0.06 to 0.60 parts by mass, particularly preferably from 0.10 to 0.50 parts by mass, and especially preferably from 0.14 to 0.40 parts by mass, relative to 100 parts by mass of the toner particle.

Cleaning performance and charge retention can be both achieved by setting the above ranges.

The toner particle may contain a colorant. Any colorant can be used. Examples of the colorant include organic pigments, organic dyes, inorganic pigments, and the like, but there is no particular limitation, and known colorants can be used. Among them, it is preferable to use magnetic bodies. This is because a magnetic body present on the toner particle surface not only serves as a colorant, but also has the effect of moderately lowering the charging performance of the surface. A preferable addition amount is from 30 parts by mass to 150 parts by mass with respect to 100 parts by mass of the binder resin.

The number-average particle diameter of the primary particle of the magnetic bodies contained in the toner of the present invention is preferably 500 nm or less, more preferably from 50 nm to 300 nm.

The number-average particle diameter of primary particle of the magnetic body present on the surface of the toner particle is preferably from 50 to 500 nm, more preferably from 50 to 300 nm, and yet more preferably from 100 to 200 nm.

The number-average particle diameter of primary particle of the magnetic body present on the surface of the toner particle can be measured using a transmission electron microscope.

The residual magnetization ($\sigma r$) of the magnetic body present on the surface of the toner particle is preferably from 2 to 22 $Am^2/kg$, more preferably from 4 to 20 $Am^2/kg$, yet more preferably from 4 to 18 $Am^2/kg$, and particularly preferably from 6 to 10 $Am^2/kg$. By controlling the $\sigma r$ of the magnetic body within the above ranges, the toner disperses, is developed and is transferred, while exhibiting appropriate developing performance. As a result, wet spreading of the toner at the time of the fixing process is promoted, and low-temperature fixing performance improved.

The residual magnetization of the magnetic body can be adjusted by controlling the content of Si in the magnetic body.

The content of Si in the magnetic body present on the surface of the toner particle is preferably from 0.0 to 5.0 mass %, more preferably from 0.5 to 4.0 mass % and yet more preferably from 1.0 to 3.0 mass %. The $\sigma r$ of the magnetic body can be controlled within a desired range by controlling the content of Si in the magnetic body to lie in the above ranges. By virtue of the fact that the Si content in the magnetic body is moderate, migration of charge between the externally added silica fine particle and the magnetic body is slowed down, and charge retention becomes higher.

The Si content in the magnetic body can be adjusted by controlling the amount of $SiO_2$ that is added during the production of the magnetic body.

The value Msi/(D/S)/B of a ratio of the content Msi (mass %) of Si in the magnetic body present on the surface of the toner particle relative to (D/S)/B may lie in the range from $1.8\times10^2$ to $4.8\times10^1$, and preferably lies in the range from $2.1\times10^2$ to $1.5\times10^1$. By controlling Msi/(D/S)/B so as to lie in the above range, transfer of charge between silica and the magnetic body is optimized, and image density at the time of standing in a high-temperature, high-humidity environment is increased.

Examples of magnetic bodies include iron oxides typified by magnetite, hematite and ferrite; and at least one selected from the group consisting of metals such as iron, cobalt and nickel, alloys of these metals with metals such as aluminum, copper, magnesium, tin, zinc, beryllium, calcium, manganese, selenium, titanium, tungsten and vanadium, as well as mixtures of the foregoing. The magnetic body may be subjected to a known surface treatment, as needed.

The silica fine particle is preferably a hydrophobized silica particle resulting from thermally treating the silica fine particle base together with a cyclic siloxane, followed by a heating treatment with a silicone oil. Specifically, the silica fine particle is preferably a silicone-oil-treated product of a silica fine particle treated with a cyclic siloxane.

With X parts by mass as the treatment amount by cyclic siloxane with respect to 100 parts by mass of the silica fine particle, and with Y parts by mass as the treatment amount of silicone oil with respect to 100 parts by mass of the silica fine particle, the value (X/Y) of a ratio of X to Y is preferably from 0.60 to 1.20. The above ratio is more preferably from 0.65 to 1.15, and yet more preferably from 0.70 to 1.00.

The value of D1/D can be controlled within an intended range by controlling X/Y so as to lie in the above ranges.

Silica fine particle obtained by a known method can be used without any particular limitation as the silica fine particle base which is a base material before surface treatment with silicone oil or the like. Typical examples include fumed silica, wet silica, and sol-gel silica. Also, these may be partially or wholly fused silica.

For the silica fine particle base, it is possible to select, as appropriate, and use a suitable one from fumed silica, wet silica, and the like according to the required properties of individual toners. In particular, fumed silica is excellent in the flowability-imparting effect, and is suitable as a silica fine particle base for use as an external additive for electrophotographic toners.

The silica fine particle obtained by surface treatment on the silica fine particle base for the purpose of imparting hydrophobicity and flowability is used. As a surface treatment method, there is a method of chemically treating with a silicon compound that reacts with or physically adsorbs to the silica fine particle base.

The method of surface-treating the silica fine particle base is not particularly limited and can be carried out by bringing a surface treatment agent containing siloxane bonds into contact with the silica fine particle. From the viewpoint of uniformly treating the surface of the silica fine particle base and easily achieving the above physical properties, it is preferable to bring the surface treatment agent into contact with the silica fine particle base in a dry manner. As will be described hereinbelow, a method of contacting the vapor of a surface treatment agent with raw silica fine particle, or a method of spraying an undiluted solution of the surface treatment agent or a solution obtained by diluting with various solvents to bring the solution into contact with the silica fine particle base can be used.

As a method for surface-treating a silica fine particle base, a method for producing silica fine particle is preferable that includes a step of surface-treating (dry treatment) the silica fine particle base with a cyclic siloxane as the first treatment, and a step of surface-treating (dry treatment) the silica fine particle base after the cyclic siloxane treatment with silicone oil as the second treatment. The silica fine particle is preferably obtained by treating a silica fine particle with cyclic siloxane and then treating the treatment product with silicone oil. A method for producing a toner preferably includes a step of preparing a silica fine particle obtained by the above method.

Regarding the first treatment, high-temperature treatment with a cyclic siloxane having a low molecular weight can efficiently reduce the amount of silanol groups on the surface of the silica fine particle base and also add a short dimethylsiloxane chain having terminal OH groups to the surface of the silica fine particle base.

The temperature for treating the surface of the silica fine particle base with a cyclic siloxane is preferably 300° C. or higher. Where the temperature is 300° C. or higher, the amount of silanol groups on the surface of the silica fine particle base can be effectively reduced. Moreover, where the treatment temperature is 300° C. or higher, siloxane bonds are generated and broken, and the surface of the silica fine particle base can be treated more uniformly while controlling to obtain uniform siloxane chain lengths.

The temperature for treating the surface of the silica fine particle base with a cyclic siloxane is preferably 310° C. or higher, more preferably 320° C. or higher, and even more preferably 330° C. or higher. Although the upper limit is not particularly limited, it is preferably 380° C. or lower, more preferably 350° C. or lower.

After the cyclic siloxane treatment, the silica fine particle base subjected to the cyclic siloxane treatment is heat-treated with silicone oil as the second treatment. The silicone oil bonds with the terminal OH groups of the component obtained by reaction with the cyclic siloxane in the first treatment, and a long-chain dimethylsiloxane component can be introduced onto the silica fine particle surface. The temperature at which the surface of the silica fine particle base is treated with silicone oil is preferably 300° C. or higher, more preferably 320° C. or higher, and even more preferably 330° C. or higher. Although the upper limit is not particularly limited, it is preferably 380° C. or lower, more preferably 350° C. or lower.

By controlling the treatment amount X with the cyclic siloxane and the treatment amount Y with the silicone oil described above, the amount of silanol component on the surface of the silica fine particle base can be reduced, the above-described D unit amount and D1 amount can be controlled, and the charging stability can be improved, without lowering the flowability of the toner, with a small surface treatment amount.

As the cyclic siloxane, at least one selected from the group consisting of low-molecular-weight cyclic siloxanes having rings with up to 10 members, such as hexamethylcyclotrisiloxane, octamethylcyclotetrasiloxane, decamethylcyclopentasiloxane, and the like, can be used. Among them, octamethylcyclotetrasiloxane is preferred.

In addition, silicone oil indicates an oily substance having a molecular structure with a siloxane bond constituting a main chain, and as long as the above-mentioned formula (3) is satisfied, generally available silicone oils can be used without particular limitation.

Specific examples include silicone oils composed of linear polysiloxane skeletons such as dimethyl silicone oil, alkyl-modified silicone oil, olefin-modified silicone oil, fatty acid-modified silicone oil, alkoxy-modified silicone oil, polyether-modified silicone oil, carbinol-modified silicone oil, and the like.

The treatment time in the first treatment and the second treatment varies depending on the treatment temperature and the reactivity of the surface treatment agent used, but is preferably from 5 min to 300 min, more preferably from 30 min to 240 min, and still more preferably from 50 min to 200 min. The treatment temperature and treatment time of the surface treatment within the above ranges are preferable from the viewpoint of sufficiently reacting the treatment agent with the silica fine particle base and from the viewpoint of production efficiency.

The surface treatment agent is brought into contact with the silica fine particle base in the first treatment preferably by a method of contacting the vapor of the surface treatment agent under reduced pressure or in an inactive gas atmosphere such as a nitrogen atmosphere. By using the vapor contact method, the surface treatment agent that does not react with the silica fine particle surface can be easily removed, and the silica fine particle surface can be adequately covered with modifying groups having appropriate polarity. When using the method of contacting the vapor of the surface treatment agent, the treatment is preferably performed at a treatment temperature equal to or higher than the boiling point of the surface treatment agent. The vapor contact may be carried out in multiple batches.

When the vapor of the surface treatment agent is brought into contact in an inactive gas atmosphere such as a nitrogen atmosphere, the pressure (gauge pressure) of the vapor of the surface treatment agent in a container is preferably from 50 kPa to 300 kPa, more preferably from 150 kPa to 250 kPa.

The toner particle may contain a binder resin. Examples of the binder resin include vinyl resins, polyester resins, and the like. The binder resin is not particular limited, and known resins can be used.

Specific examples of vinyl resins include polystyrene and styrene-based copolymers such as styrene-propylene copolymer, styrene-vinyl toluene copolymer, styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, styrene-butyl methacrylate copolymer, styrene-octyl methacrylate copolymer, styrene-butadiene copolymer, styrene-isoprene copolymer, styrene-maleic acid copolymer, styrene-maleic acid ester copolymer, and the like, polyacrylic acid esters, polymethacrylic acid esters, polyvinyl acetate, and the like, and these can be used singly or in combination. Among these, styrene-based copolymers and polyester resins are particularly preferred in view of developing characteristics fixing performance and the like.

Preferably, a charge control agent is added to the toner particle.

Effective charge control agents for negative charging include organometallic compounds and chelate compounds; examples thereof are for instance monoazo metal complex compounds; acetylacetone metal complex compounds; and metal complex compound of aromatic hydroxycarboxylic acids or aromatic dicarboxylic acids.

Concrete examples of commercial products of such charge control agents include Spilon Black TRH, T-77 and T-95 (by Hodogaya Chemical Co., Ltd.) and BONTRON (registered trademark) S-34, S-44, 5-54, E-84, E-88 and E-89 (by Orient Chemical Industries Co., Ltd.).

Examples of charge control agents for positive charging include nigrosin and modified products thereof with a fatty acid metal salt; onium salts such as quaternary ammonium salts, for instance tributylbenzylammonium 1-hydroxy-4-naphthosulfonate and tetrabutylammonium tetrafluoroborate, and phosphonium salts that are analogues of the foregoing, as well as lake pigments of the foregoing; triphenylmethane dyes and lake pigments thereof (examples of laking agents include phosphotungstic acid, phosphomolybdic acid, phosphotungstomolybdic acid, tannic acid, lauric acid, gallic acid, ferricyanic acid and ferrocyanide compounds); metal salts of higher fatty acids; diorganotin oxides such as dibutyltin oxide, dioctyltin oxide and dicyclohexyltin oxide; and diorganotin borates such as dibutyltin borate, dioctyltin borate and dicyclohexyltin borate.

Concrete examples of commercially available products of the foregoing include TP-302 and TP-415 (Hodogaya Chemical Co., Ltd.), BONTRON (registered trademark) N-01, N-04, N-07, and also P-51 (Orient Chemical Industries Co., Ltd.), and Copy Blue PR (Clariant AG).

These charge control agents can be used singly or in combinations of two or more types. In terms of the charge quantity of the toner, the use amount of these charge control agents is preferably from 0.1 to 10.0 parts by mass, more preferably from 0.1 to 5.0 parts by mass, relative to 100 parts by mass of the binder resin.

The toner particle may contain a release agent, as needed, for the purpose of improving fixing performance. The release agent is not particularly limited, and known release agents can be used.

Specifically, petroleum waxes and derivatives thereof such as paraffin wax, microcrystalline wax, and petrolatum; montan wax and derivatives thereof, hydrocarbon waxes and derivatives thereof, obtained in accordance with the Fischer-Tropsch method; polyolefin waxes and derivatives thereof typified by polyethylene and polypropylene; natural waxes and derivatives thereof such as carnauba wax and candelilla wax; as well as ester waxes. The above derivatives include oxides, block copolymers with vinylic monomers, and graft-modified products. As the ester wax there can be used a monofunctional ester wax, a bifunctional ester wax or a polyfunctional ester wax such as tetrafunctional and hexafunctional ester waxes.

The melting point of the release agent is preferably from 60 to 140° C., and more preferably from 70 to 130° C. When the melting point ranges from 60 to 140° C., the toner is readily plasticized at the time of fixing, and fixing performance is improved. A melting point lying within the above range is preferable since in that case for instance outmigration of the release agent is unlikelier to occur, even after long-term storage.

In addition to the silica fine particle and the strontium titanate fine particle, the toner may contain other external additives such as inorganic fine particles other than the silica fine particle and the strontium titanate fine particle. The toner can be obtained by externally adding, to the toner particle, external additives in the form of the silica fine particle, the strontium titanate fine particle, and, as needed, inorganic fine particles other than the silica fine particle and the strontium titanate fine particle. Examples of inorganic fine particles include hydrotalcite compounds, fatty acid metal salts, alumina, and metal oxide fine particles (inorganic fine particles) such as titanium oxide, zinc oxide fine particles, cerium oxide fine particles and calcium carbonate fine particles.

As other external additives there may be used also complex-oxide fine particles that utilize two or more types of metal, and there can be used two or more types of fine particles selected from among arbitrary combinations of the foregoing fine particle groups.

Resin fine particles and organic-inorganic composite fine particles of resin fine particles and inorganic fine particles can also be used herein. Preferably, the toner contains titanium oxide particles in addition to the silica fine particle, as an external additive.

These other external additives may be subjected to a hydrophobizing treatment by a hydrophobizing agent.

Examples of hydrophobizing agents include chlorosilanes such as methyltrichlorosilane, dimethyldichlorosilane, trimethylchlorosilane, phenyltrichlorosilane, diphenyldichlorosilane, t-butyldimethylchlorosilane, vinyltrichlorosilane;

alkoxysilanes such as tetramethoxysilane, methyltrimethoxysilane, dimethyldimethoxysilane, phenyltrimethoxysilane, diphenyldimethoxysilane, o-methylphenyltrimethoxysilane, p-methylphenyltrimethoxysilane, n-butyltrimethoxysilane, i-butyltrimethoxysilane, hexyltrimethoxysilane, octyltrimethoxysilane, decyltrimethoxysilane, dodecyltrimethoxysilane, tetraethoxysilane, methyltriethoxysilane, dimethyldiethoxysilane, phenyltriethoxysilane, diphenyldiethoxysilane, i-butyltriethoxysilane, decyltriethoxysilane, vinyltriethoxysilane, γ-methacryloxypropyltrimethoxysilane, γ-glycidoxypropyltrimethoxysilane, γ-glycidoxypropylmethyldimethoxysilane, γ-mercaptopropyltrimethoxysilane, γ-chloropropyltrimethoxysilane, γ-aminopropyltrimethoxysilane, γ-aminopropyltriethoxysilane, γ-(2-aminoethyl)aminopropyltrimethoxysilane, γ-(2-aminoethyl) aminopropylmethyldimethoxysilane, and the like;

silazanes such as hexaethyldisilazane, hexapropyldisilazane, hexabutyldisilazane, hexapentyldisilazane, hexahexyldisilazane, hexacyclohexyldisilazane, hexaphenyldisilazane, divinyltetramethyldisilazane, dimethyltetravinyldisilazane, and the like;

silicone oils such as dimethyl silicone oil, methyl hydrogen silicone oil, methylphenyl silicone oil, alkyl-modified silicone oil, chloroalkyl-modified silicone oil, chlorophenyl-modified silicone oil, fatty acid-modified silicone oil, polyether-modified silicone oil, alkoxy-modified silicone oil, carbinol-modified silicone oil, amino-modified silicone oil, fluorine-modified silicone oil, terminally reactive silicone oil, and the like;

siloxanes such as hexamethylcyclotrisiloxane, octamethylcyclotetrasiloxane, decamethylcyclopentasiloxane, hexamethyldisiloxane, octamethyltrisiloxane, and the like; and fatty acids and metal salts thereof, such as long-chain fatty acids such as undecylic acid, lauric acid, tridecylic acid, dodecylic acid, myristic acid, palmitic acid, pentadecylic acid, stearic acid, heptadecylic acid, arachidic acid, montanic acid, oleic acid, linoleic acid, arachidonic acid, and the like, and salts of these fatty acids with metals such as zinc, iron, magnesium, aluminum, calcium, sodium, lithium, and the like.

Among these, alkoxysilanes, silazanes, and silicone oils are preferably used because the hydrophobizing treatment may be easily performed. One of these hydrophobizing agents may be used alone, or two or more thereof may be used in combination.

The content of the external additive is preferably from 0.05 to 20.0 parts by mass relative to 100 parts by mass of the toner particle. The content of external additive other than the silica fine particle and the strontium titanate fine particle is preferably from 0.1 to 1.0 parts by mass, and more preferably from 0.1 to 0.5 parts by mass, relative to 100 parts by mass of the toner particle.

The weight-average particle diameter (D4) of the toner is preferably from 3.0 to 12.0 μm, more preferably from 4.0 to 10.0 μm. Good flowability can be obtained, and the latent image can be developed faithfully, when the weight-average particle diameter (D4) lies within the above ranges.

The manufacturing method of the toner is not particularly limited, and a known manufacturing method can be adopted. Methods for producing toner include a pulverization method, a polymerization method, a dispersion polymerization method, an association aggregation method, a dissolution suspension method, a suspension polymerization method, an emulsion aggregation method, and the like.

A specific example of a pulverization method for producing toner through a melt-kneading step and a pulverization step is given below, but the present invention is not limited thereto.

For example, a binder resin and, if necessary, a colorant, a release agent, a charge control agent and other additives are thoroughly mixed with a mixer such as a Henschel mixer or a ball mill (mixing step). The obtained mixture is melt-kneaded using a thermal kneader such as a twin-screw kneading extruder, a heating roll, a kneader, and an extruder (melt-kneading step).

After cooling and solidifying the resulting melt-kneaded product, pulverization using a pulverizer (pulverization step) and classification using a classifier (classification step) are performed to obtain toner particles. Further, if necessary, toner particles and external additives are mixed with a mixer such as a Henschel mixer to obtain a toner.

Examples of the mixer are presented hereinbelow. FM mixer (Nippon Coke Industry Co., Ltd.); SUPERMIXER (manufactured by Kawata Mfg. Co., Ltd.); RIBOCONE (manufactured by Okawara Mfg. Co., Ltd.); NAUTA MIXER, TURBULIZER, and CYCLOMIX (manufactured by Hosokawa Micron Corporation); SPIRAL PIN MIXER (manufactured by Pacific Machinery & Engineering Co., Ltd.); LODIGE MIXER (manufactured by Matsubo Corporation).

Examples of the thermal kneader are presented hereinbelow. KRC kneader (manufactured by Kurimoto, Ltd.); BUSS Co-kneader (manufactured by Buss AG); TEM-type extruder (manufactured by Toshiba Machine Co., Ltd.); TEX twin-screw kneader (manufactured by The Japan Steel Works, Ltd.); PCM kneader (manufactured by Ikegai Iron Works Co., Ltd.); a three-roll mill, a mixing roll mill, and a kneader (manufactured by Inoue Mfg. Inc.); KNEADEX (manufactured by Mitsui Mining Co., Ltd.); MS-type pressurizing kneader and KNEADER-RUDER (manufactured by Moriyama Seisakusho KK); and Banbury mixer (manufactured by Kobe Steel, Ltd.).

Examples of the pulverizer are presented hereinbelow. COUNTER JET MILL, MICRON JET, and INOMIZER (manufactured by Hosokawa Micron Corporation); IDS type mill and PJM jet pulverizer (manufactured by Nippon Pneumatic Mfg. Co., Ltd.); CROSS JET MILL (manufactured by Kurimoto Iron Works Co., Ltd.); ULMAX (manufactured by Nisso Engineering Co., Ltd.); SK Jet-O-Mill (manufactured by Seishin Enterprise Co., Ltd.); KRYPTRON (manufactured by Kawasaki Heavy Industries, Ltd.); TURBO MILL (manufactured by Turbo Kogyo Co., Ltd.); and SUPER-ROTOR (manufactured by Nisshin Engineering Co., Ltd.).

Examples of the classifier are presented hereinbelow. CLASSIEL, MICRON CLASSIFIER, and SPEDIC CLASSIFIER (manufactured by Seishin Enterprise Co., Ltd.); TURBO CLASSIFIER (manufactured by Nisshin Engineering Inc.); MICRON SEPARATOR, TURBOPLEX (ATP), and TSP SEPARATOR (manufactured by Hosokawa Micron Corporation); ELBOW JET (manufactured by Nittetsu Mining Co., Ltd.), DISPERSION SEPARATOR (manufactured by Nippon Pneumatic Industry Co., Ltd.); YM MICRO CUT (Yaskawa Co., Ltd.).

In addition, the following sieving device may be used to sieve coarse particles. ULTRASONIC (manufactured by Koeisangyo Co., Ltd.); RESONATOR SIEVE and GYRO SHIFTER (Tokuju Corporation); VIBRASONIC SYSTEM (manufactured by Dalton Corportaion); SONIC CLEAN (manufactured by Sintokogio, Ltd.); TURBO-SCREENER (manufactured by Turbo Kogyo Co., Ltd.); MICRO SIFTER (manufactured by Makino Mfg. Co., Ltd.); and a circular vibrating screen.

A toner particle is produced, for example, as follows by a suspension polymerization method.

For example, a styrene-based monomer and a (meth) acrylic acid ester-based monomer as polymerizable monomers that will form the binder resin, a colorant, a wax component, a polymerization initiator, and the like are homogenously dissolved or dispersed with a disperser such as a homogenizer, a ball mill, an ultrasonic disperser, or the like to prepare a polymerizable monomer composition. The polymerizable monomer composition is dispersed in an aqueous medium to granulate particles of the polymerizable monomer composition, and then the polymerizable monomers in the particles of the polymerizable monomer composition are polymerized to obtain a toner particle.

At this time, the polymerizable monomer composition is preferably prepared by mixing a dispersion liquid obtained by dispersing a colorant in the first polymerizable monomer (or some of the polymerizable monomers) with at least the second polymerizable monomer (or the rest of the polymerizable monomers). That is, the colorant can be made to be present in the polymer particle in a better dispersed state by sufficiently dispersing the colorant in the first polymerizable monomer and then mixing with the second polymerizable monomer together with other toner materials.

A toner particle is obtained by filtering, washing, drying and classifying the obtained polymer particles by known methods. A toner can be obtained by externally adding a silica fine particle to the toner particle obtained as described above.

The external addition of an external additive such as a silica fine particle to the toner particle can be performed by mixing the toner particle and the external additive with the following mixer.

Examples of the mixer are presented hereinbelow. Henschel mixer (manufactured by Mitsui Mining Co., Ltd.); SUPERMIXER (manufactured by Kawata Mfg. Co., Ltd.); RIBOCONE (manufactured by Okawara Mfg. Co., Ltd.); NAUTA MIXER, TURBULIZER, and CYCLOMIX (manufactured by Hosokawa Micron Corporation); SPIRAL PIN MIXER (manufactured by Pacific Machinery & Engineering Co., Ldg.); and LODIGE MIXER (manufactured by Matsubo Corporation).

From the viewpoint of dispersibility of the external additive, the mixing time in the external addition step is preferably adjusted in the range of from 0.5 min to 10.0 min, more preferably adjusted in the range of from 1.0 min to 5.0 min.

The method for producing a toner includes a step of obtaining a toner particle, a step of preparing a silica fine particle, and a step of externally adding the silica fine particle to and mixing with the obtained toner particle to obtain the toner.

Methods for measuring various physical properties will be explained next.

Method for Calculating (D/S)/B and D1/D by Solid-State $^{29}$Si-NMR DD/MAS

Measurement of the Silica Fine Particle

Solid-state $^{29}$Si-NMR measurement of the silica fine particle is performed through separation of the silica fine particle from the toner surface. An explanation follows next on a method for separating the silica fine particle from the toner surface, and on a solid-state $^{29}$Si-NMR measurement.

Method for Separating Silica Fine Particle from Toner Surface

When the silica fine particle separated from the toner surface are used as a measurement sample, the silica fine particle is separated from the toner in the following procedure.

A total of 1.6 kg of sucrose (manufactured by Kishida Chemical Co., Ltd.) is added to 1 L of ion-exchanged water and dissolved under heating in a hot water bath to prepare a concentrated sucrose solution. A total of 31 g of the concentrated sucrose solution and 6 mL of CONTAMINON N (a 10% by mass aqueous solution of a neutral detergent for washing precision measuring instruments at pH 7, which consists of a nonionic surfactant, an anionic surfactant, and an organic builder, manufactured by Wako Pure Chemical Industries, Ltd.) are placed in a centrifugation tube to prepare a dispersion liquid. The toner, 10 g, is added to this dispersion liquid, and lumps of the toner are loosened with a spatula or the like.

The centrifugation tube is set in the "KM Shaker" (model: V. SX) manufactured by Iwaki Sangyo Co., Ltd. and shaken for 20 min at 350 reciprocations per minute. After shaking, the solution is transferred in a swing rotor glass tube (50 mL) and centrifuged under the conditions of 3500 rpm and 30 min in a centrifuge.

In the glass tube after centrifugation, toner particle is present in the uppermost layer, and an inorganic fine particle mixture containing a silica fine particle is present in the aqueous solution side of the lower layer. The aqueous solution of the upper layer and the aqueous solution of the lower layer are separated and dried to obtain a toner particle from the upper layer side and an inorganic fine particle mixture from the lower layer side. The obtained toner particle is used to measure the abundance ratio of the magnetic body described hereinbelow. The above centrifugation step is repeated so that the total amount of the inorganic fine particle mixture obtained from the lower layer side is 10 g or more.

Subsequently, 10 g of the resulting inorganic fine particle mixture is added to and dispersed in a dispersion liquid containing 100 mL of ion-exchanged water and 6 mL of CONTAMINON N. The resulting dispersion liquid is transferred to a swing rotor glass tube (50 mL) and centrifuged under the conditions of 3500 rpm and 30 min in a centrifuge.

In the glass tube after centrifugation, the silica fine particle is present in the uppermost layer, and other inorganic fine particles are present in the aqueous solution side of the lower layer. The aqueous solution of the upper layer is collected, centrifugal separation is repeated as necessary, and after sufficient separation, the dispersion liquid is dried and the silica fine particle is collected.

Next, solid-state $^{29}$Si-NMR measurement of the silica fine particle recovered from the toner particle is performed under the measurement conditions shown hereinbelow.

DD/MAS Measurement Conditions for Solid-State $^{29}$Si-NMR Measurement

DD/MAS measurement conditions for solid-state $^{29}$Si-NMR measurement are as follows.

Device: JNM-ECX5002 (JEOL RESONANCE)

Temperature: room temperature

Measurement method: DD/MAS method $^{29}$Si 45°

Sample tube: zirconia 3.2 mmφ

Sample: filled in test tube in powder form

Sample rotation speed: 10 kHz

Relaxation delay: 180 s

Scan: 2000

Calibration standard material: DSS (sodium 3-(trimethylsilyl)-1-propanesulfonate)

After the above measurement, a plurality of silane components with different substituents and bonding groups are peak-separated into the following M unit, D unit, T unit, and Q unit by curve fitting from the solid-state $^{29}$Si-NMR spectrum of the silica fine particle.

Curve fitting is performed using JEOL JNM-EX400 software EXcalibur for Windows (registered trademark) version 4.2 (EX series). "1D Pro" is clicked from the menu icon to load the measurement data. Next, "Curve fitting function" is selected from "Command" on the menu bar to perform curve fitting. Curve fitting is performed for each component so that the difference (composite peak difference) between the composite peak obtained by combining the peaks obtained by curve fitting and the peak of the measurement result is minimized.

$$\text{M unit: } (R_i)(R_j)(R_k)SiO_{1/2} \tag{4}$$

$$\text{D unit: } (R_g)(R_h)Si(O_{1/2})_2 \tag{5}$$

$$\text{T unit: } R_mSi(O_{1/2})_3 \tag{6}$$

$$\text{Q unit: } Si(O_{1/2})_4 \tag{7}$$

$R_i$, $R_j$, $R_k$, $R_g$, $R_h$, and $R_m$ in the formulas (4), (5), and (6) are each an alkyl group such as a hydrocarbon group having from 1 to 6 carbon atoms, a halogen atom, a hydroxy group, an acetoxy group, an alkoxy group, or the like bonded to silicon.

Further, for the D unit peak, waveform separation is performed individually using the Voigt function, and the area of the peak D1 in the range of more than −19 ppm and −17 ppm or less is calculated.

After peak separation, the integrated value of D units present in the chemical shift range of from −25 to −15 ppm. Further, the sum S of all the integrated values of M, D, T, and Q units present in the range of from −140 to 100 ppm are calculated, the BET specific surface area B ($m^2/g$) of the silica fine particle is obtained by the method described hereinbelow, and the ratio (D/S)/B is calculated. Also, the ratio D1/D is calculated from the integrated values of the peaks D1 and D obtained by waveform separation.

Furthermore, after the operation of washing the silica fine particle with chloroform is performed as shown below, the same NMR measurement is performed to calculate (D/S)/B after washing.

Washing Silica Fine Particle with Chloroform

A total of 100 mL of chloroform and 1 g of silica fine particle are placed into a centrifuge tube and stirred with a spatula or the like. The tube for centrifugation is set on the KM Shaker and shaken for 20 min at 350 reciprocations per minute. After shaking, the mixture is transferred to a swing rotor glass tube and centrifuged under the conditions of 3500 rpm and 30 min in a centrifuge. The supernatant is discarded, 100 mL of chloroform is added again, and shaking and centrifugation are performed twice. Precipitated silica fine particle is collected and vacuum-dried at 40° C. for 24 h to obtain a washed silica fine particle.

Method for Measuring Fragment Ions on Silica Fine Particle Surface by Time-of-Flight Secondary Ion Mass Spectrometry (TOF-SIMS)

TOF-SIMS measurement of a silica fine particle is performed using the silica fine particle separated from the toner by the above-described method for separating a silica fine particle from the toner surface. TRIFT-IV manufactured by ULVAC-PHI, Inc. is used for fragment ion measurement of silica fine particle surface using TOF-SIMS.

The analysis conditions are as follows.

Sample preparation: silica microparticles are caused to adhere to an indium sheet Primary ion: Au ion.

Accelerating voltage: 30 kV.

Charge neutralization mode: On.

Measurement mode: Positive.

Raster: 200 μm.

Measurement time: 60 s.

Whether fragment ions corresponding to the structure represented by the formula (1) are observed is confirmed from the obtained mass profile of secondary ion mass/secondary ion charge number (m/z). For example, where the surface treatment agent is polydimethylsiloxane or cyclic siloxane, fragment ions are observed at m/z=147, 207, and 221 positions.

Method for Measuring BET Specific Surface Area of Silica Fine Particle

The BET specific surface area of silica fine particle is measured by the following procedure. As a measuring device, "Automatic Specific Surface Area/Pore Size Distribution Measuring Device TriStar 3000 (manufactured by Shimadzu Corporation)", which adopts a gas adsorption method based on a constant volume method as a measuring method, is used. Setting of measurement conditions and analysis of measurement data are performed using the dedicated software "TriStar 3000 Version 4.00" provided with the device. A vacuum pump, a nitrogen gas pipe, and a helium gas pipe are connected to the device. Using nitrogen gas as the adsorption gas, the value calculated by the BET multipoint method is defined as the BET specific surface area.

The BET specific surface area is calculated as follows. First, nitrogen gas is adsorbed on the silica fine particle, and the equilibrium pressure P (Pa) in the sample cell at that time and the nitrogen adsorption amount $V_a$ ($mol \cdot g^{-1}$) of the magnetic bodies are measured. Then, an adsorption isotherm is obtained in which a relative pressure $P_r$, which is the value obtained by dividing the equilibrium pressure P (Pa) in the sample cell by the saturated vapor pressure $P_0$ (Pa) of nitrogen, is plotted against the abscissa, and the nitrogen adsorption amount $V_a$ ($mol \cdot g^{-1}$) is plotted against the ordinate. Next, a monomolecular layer adsorption amount $V_m$ ($mol \cdot g^{-1}$), which is an adsorption amount necessary to form a monomolecular layer on the surface of the silica fine particle, is obtained by using the following BET formula.

$$P_r/V_a(1-P_r)=1/(V_m \times C)+(C-1)\times P_r/(V_m \times C)$$

(Here, C is a BET parameter, which is a variable that varies depending on the type of measurement sample, the type of adsorbed gas, and the adsorption temperature.)

Where $P_r$ is the X-axis and $P_r/V_a(1-P_r)$ is the Y-axis, the BET formula can be interpreted as a straight line with a slope of $(C-1)/(V_m \times C)$ and an intercept of $1/(V_m \times C)$ (this straight line is called a BET plot).

$$\text{Slope of straight line}=(C-1)/(V_m \times C).$$

$$\text{Intercept of straight line}=1/(V_m \times C).$$

By plotting the measured values of $P_r$ and the measured values of $P_r/V_a(1-P_r)$ on a graph and drawing a straight line by using the least squares method, the values of slope and intercept of the straight line can be calculated. Using these values, $V_m$ and C can be calculated by solving the simultaneous equations for the slope and the intercept. Further, the BET specific surface area S ($m^2/g$) of the silica fine particle is calculated based on the following formula from the $V_m$ calculated above and the cross-sectional area occupied by the nitrogen molecule (0.162 $nm^2$).

$$S=V_m \times N \times 0.162\times 10^{-18}$$

(Here, N is Avogadro's number ($mol^{-1}$)).

Specifically, measurements using this device are performed according to the following procedure.

The tare of a well-washed and dried dedicated glass sample cell (stem diameter ⅜ inch, volume 5 mL) is accurately weighed. Then, using a funnel, 0.1 g of silica fine particle is placed into this sample cell. The sample cell containing silica fine particle is set in a "PRETREATMENT DEVICE VACUUM PREP 061 (manufactured by Shimadzu Corporation)" to which a vacuum pump and a nitrogen gas pipe are connected, and vacuum degassing is continued at 23° C. for 10 h.

The vacuum degassing is gradually performed while adjusting a valve so that the silica fine particle is not sucked into the vacuum pump. The pressure inside the cell gradually decreases in the course of degassing and finally reaches 0.4 Pa (about 3 mTorr).

After the vacuum degassing is completed, nitrogen gas is gradually injected to return the inside of the sample cell to atmospheric pressure, and the sample cell is detached from the pretreatment device. The mass of the sample cell is accurately weighed, and the exact mass of the silica fine particle is calculated from the difference from the tare. At this time, the sample cell is covered with a rubber plug during weighing so that the silica fine particle in the sample cell is not contaminated with moisture in the atmosphere.

Next, a dedicated isothermal jacket is attached to the sample cell containing the silica fine particle. A dedicated filler rod is inserted into this sample cell, and the sample cell is set in the analysis port of the device. The isothermal jacket is a cylindrical member with the inner surface made of a porous material and the outer surface made of an impermeable material. The isothermal jacket can suck up liquid nitrogen to a certain level by capillary action.

Next, a free space of the sample cell, including the connecting device is measured. The free space is calculated by measuring the volume of the sample cell by using helium gas at 23° C., then measuring the volume of the sample cell after cooling the sample cell with liquid nitrogen by similarly using helium gas, and converting from the difference in volume. In addition, the saturated vapor pressure $P_0$ (Pa) of nitrogen is separately and automatically measured using a $P_0$ tube built into the device.

Next, after the inside of the sample cell is vacuum degassed, the sample cell is cooled with liquid nitrogen while vacuum degassing is continued. Thereafter, nitrogen gas is introduced stepwise into the sample cell to cause the silica fine particle to adsorb nitrogen molecules. At this time, since an adsorption isotherm can be obtained by measuring the equilibrium pressure P (Pa) at any time, this adsorption isotherm is converted into a BET plot.

The points of the relative pressure $P_r$ for collecting data are set to a total of 6 points of 0.05, 0.10, 0.15, 0.20, 0.25, and 0.30. A straight line is drawn on the obtained measurement data by the least squares method, and $V_m$ is calculated from the slope and intercept of the straight line. Further, using this $V_m$ value, the BET specific surface area of the silica fine particle is calculated as described above.

Method for Measuring Si—OH Content of Silica Fine Particle

The amount of Si—OH in the silica fine particle can be determined by the following method using the silica fine particle separated from the toner by the method for separating the silica fine particle from the toner surface described above.

A sample liquid 1 is prepared by mixing 25.0 g of ethanol and 75.0 g of a 20% by mass sodium chloride aqueous solution. Further, 2.00 g of silica fine particles are accurately weighed in a glass bottle, and a sample liquid 2 is prepared by adding a solvent obtained by mixing 25.0 g of ethanol and 75.0 g of a 20% by mass sodium chloride aqueous solution. The sample liquid 2 is stirred with a magnetic stirrer for 5 min or longer to disperse the silica fine particle.

Then, the pH change of each of sample liquids 1 and 2 is measured while dropping 0.1 mol/L sodium hydroxide aqueous solution at 0.01 mL/min. The titer (L) of sodium hydroxide aqueous solution when pH 9.0 is reached is recorded. The amount Sn ($/nm^2$) of Si—OH per 1 $nm^2$ can be calculated from the following formula.

$$Sn=\{(a-b)\times c\times NA\}/(d\times e)$$

a: NaOH titer (L) of sample liquid 2.

b: NaOH titer (L) of sample liquid 1.

c: concentration of NaOH solution used for titration (mol/L).

NA: Avogadro's number.

d: mass of silica fine particle (g).

e: BET specific surface area of silica fine particle ($nm^2/g$: converted from the specific surface area ($m^2/g$) obtained below).

Method for Calculating Coverage Ssi of Surface of Toner Particle by Silica Fine Particle The coverage Ssi of the toner particle surface by the silica fine particle is calculated from a backscattered electron image acquired by observation with a scanning electron microscope (SEM). A backscattered electron image is also called a "composition image", and the smaller the atomic number, the darker the detected image, and the larger the atomic number, the brighter the detected image. The backscattered electron image of the toner is acquired under the following observation conditions. A method for acquiring a backscattered electron image of the toner and a method for calculating the coverage of the toner particle surface by the silica fine particle are described hereinbelow.

Method for Acquiring Backscattered Electron Image of Toner

Apparatus used: ULTRA PLUS, manufactured by Carl Zeiss Microscopy Co., Ltd.

Accelerating voltage: 1.0 kV.

WD: 2.5 mm.

Aperture size: 30.0 μm.

Detection signal: EsB (energy selective backscattered electron).

EsB Grid: 700V.

Observation magnification: 20,000 times.

Contrast: 63.0±5.0% (reference value).

Brightness: 38.0±5.0% (reference value).

Resolution: 1024×768 pixels.

Pretreatment: toner is sprinkled on carbon tape (no Pt vapor deposition).

Contrast and brightness are set, as appropriate, according to the state of the apparatus used. In addition, the accelerating voltage and EsB Grid are set so as to achieve items such as acquisition of structural information on the outermost surface of the toner, prevention of charge-up of an undeposited sample, and selective detection of high-energy backscattered electrons. For the observation field of view, a portion where the curvature of the toner is small is selected.

Method for Calculating Silica Coverage of Toner

The silica coverage is acquired by analyzing the backscattered electron image of the toner outermost surface obtained by the above method using image processing software ImageJ (developed by Wayne Rashand). The procedure is shown below.

First, the backscattered electron image to be analyzed is converted to 8-bit from Type in the Image menu. Next, from Filters in the Process menu, the median diameter is set to 2.0 pixels to reduce image noise. Next, the entire backscattered electron image is selected using the Rectangle Tool on the toolbar. Subsequently, Threshold is selected from Adjust in the Image menu, and a luminance threshold (from 85 to 128 (256 gradations, reference value)) is specified so that only luminance pixels derived from the silica fine particle in backscattered electrons image are selected. Finally, Measure is selected from the Analyze menu, and the value of the area ratio (% by area) of the luminance selected portion in the backscattered electron image is calculated.

The above procedure is performed for 20 fields of view for the toner to be evaluated, and the arithmetic mean value is taken as the coverage Ssi of the toner particle surface by the silica fine particle.

Methods for Ascertaining the Presence of a Magnetic Body on the Surface of a Toner Particle, and Calculating the Abundance Sm of the Magnetic Body The abundance of a magnetic body on the surface of a toner particle is calculated by observing the surface of the toner particle, obtained as a result of a separation operation of the above-described silica fine particle and the toner particle, using an a low-accelerating-voltage scanning electron microscope (SEM).

Information about the vicinity of the surface of the toner particle can be obtained in a case where the surface of the toner particle is observed with a SEM at a low accelerating voltage of 1 kV or less, since the penetration depth of the electron beam lies in the range of several tens of nanometers. Herein contrast according to the atomic mass is discerned upon observation by means of a backscattered electron detector; accordingly clear contrast is achieved between a resin portion (derived from C atoms) that makes up the toner and a portion (derived from Fe atoms) of the magnetic body present on the surface of the toner particle. Element mapping by SEM-EDX is resorted to for determining whether or not a magnetic body is present on the surface of the toner particle. A magnetic body is deemed to be present on the surface of the toner particle in a case where Fe is found at sites at which contrast relative to the resin portion is obtained as a result of the above operation.

A method for acquiring a low-accelerating-voltage SEM backscattered electron image of a toner particle will be explained next in detail.

Method for Acquiring a Low-Accelerating-Voltage SEM Backscattered Electron Image of a Toner Particle Apparatus used: ULTRA PLUS by Carl Zeiss Microscopy GmbH Accelerating voltage: 1.0 kV WD: 2.5 mm Aperture size: 30.0 μm Detection signal: EsB (energy-selective backscattered electron)

EsB Grid: 700 V

Observation magnifications: 20,000 magnifications

Contrast: 63.0±5.0% (reference value)

Brightness: 38.0±5.0% (reference value)

Resolution: 1024×768 pixels

Pretreatment: toner particle sprinkled on carbon tape (without Pt vapor deposition)

Contrast and brightness are set as appropriate depending on the state of the device that is used. The accelerating voltage and EsB grid are set so as to achieve acquisition of structural information about the outermost surface of the toner, forestalling of charge-up of an undeposited sample, and selective detection of high-energy backscattered electrons. A site of small toner curvature is selected as the observation field of view.

The abundance of the magnetic body on the surface of the toner particle can be calculated as follows.

Method for Calculating the Abundance of a Magnetic Body on the Surface of the Toner Particle The abundance of the magnetic body is worked out by analyzing a low-accelerating-voltage SEM backscattered electron image of the toner particle obtained in accordance with the above method, relying on image processing software ImageJ (developed by Wayne Rashand). The procedure involved is as follows.

Firstly, the backscattered electron image to be analyzed is converted to a 8-bit image, from Type in the Image menu. Then, through Filters in the Process menu, the Median diameter is set to 2.0 pixels, to reduce image noise. The entire backscattered electron image is selected next using the Rectangle Tool on the toolbar. Subsequently, Threshold is selected from Adjust in the Image menu, and a brightness threshold value (147 to 255 (256 gradations; reference value)) is designated so that there is selected only the portion where the magnetic body is present, from among the backscattered electrons. Lastly, Measure is selected from the Analyze menu, to calculate the value of the area ratio (area %) of a brightness selection portion in the backscattered electron image.

The above procedure is performed for 20 fields of view of the toner particle to be evaluated, and then the arithmetic mean value of the results is taken as the abundance Sm of the magnetic body on the surface of the toner particle.

Method for Measuring Number-Average Particle Diameter of Primary Particle of Silica Fine Particle The number-average particle diameter of the silica fine particle is measured from a secondary electron image acquired by observing the toner surface with a scanning electron microscope (SEM).

Method for Acquiring Secondary Electron Image of Toner

Apparatus used: ULTRA PLUS, manufactured by Carl Zeiss Microscopy Co., Ltd.

Accelerating voltage: 1.0 kV.

WD: 2.5 mm.

Aperture size: 30.0 μm.

Detection signal: SE2 (secondary electron).

Observation magnification: 50,000 times.

Resolution: 1024×768 pixels.

Pretreatment: toner is sprinkled on carbon tape (no Pt vapor deposition).

The maximum diameter of 100 primary particles of a silica fine particle on the toner particle surface is measured from the resulting secondary electron image, and the arithmetic mean value is taken as the number-average particle diameter of the silica particle.

The silica fine particle and the strontium titanate fine particle are distinguished by elemental mapping with SEM-EDX.

Method for Measuring C Amount in Silica Fine Particle

The C amount (carbon amount) in silica fine particle which is derived from the hydrophobizing agent is measured using a carbon/sulfur analyzer (trade name: EMIA-320) manufactured by HORIBA.

A total of 0.3 g of silica fine particle as a sample is accurately weighed and put it into a crucible for the carbon/sulfur analyzer. To this, 0.3 g±0.05 g of tin (supplementary item number 9052012500) and 1.5 g±0.1 g of tungsten (supplementary item number 9051104100) are added as combustion improvers. After that, the silica fine particle is heated at 1100° C. in an oxygen atmosphere according to the instruction manual provided with the carbon/sulfur analyzer. As a result, the hydrophobic groups derived from the hydrophobizing agent on the surface of the silica fine particle are thermally decomposed into $CO_2$, and the amount thereof is measured. The C amount (% by mass) contained in the silica fine particle is determined from the obtained amount of $CO_2$.

Calculation of C Amount Immobilization Rate of Silica Fine Particle Washing with Chloroform: Extraction of Non-Immobilized Treatment Agent A silica fine particle separated from the toner by the method for separating a silica fine particle from the toner surface described above can be used.

A total of 0.50 g of silica fine particles and 40 mL of chloroform are placed into an Erlenmeyer flask, covered with a lid, and stirred (magnetic stirrer, 300 rpm) for 2 h. After that, the stirring is stopped, and the mixture is allowed to stand for 12 h. Then centrifuging is performed, and the entire supernatant is removed. A centrifuge manufactured by Kokusan Corp. (trade name: H-9R) is used, the centrifugation is performed using a Bn1 rotor and a plastic centrifuge tube for the Bn1 rotor and under the conditions of 20° C., 10000 rpm, and 5 min.

The centrifuged silica fine particle is placed into the Erlenmeyer flask again, 40 mL of chloroform is added, a lid is placed, and stirring is performed (magnetic stirrer, 300 rpm) for 2 h. After that, the stirring is stopped, and the mixture is allowed to stand for 12 h. Then centrifuging is performed to remove all supernatant. This operation is repeated two more times. Then, the obtained sample is dried at 50° C. for 2 h using a thermostat. Further, chloroform is sufficiently volatilized by reducing the pressure to 0.07 MPa and drying at 50° C. for 24 h.

Measurement of C Amount

The C amount in the silica fine particle washed with chloroform as described above and the C amount in the silica fine particle before washing with chloroform are measured according to the above "Method for Measuring C Amount in Silica Fine Particle". The C amount immobilization rate of the silica fine particle can be calculated by the following formula.

$$C \text{ amount immobilization rate } [\%] = [(C \text{ amount in silica fine particle treated with chloroform})/(C \text{ amount in silica fine particle before washing with chloroform})] \times 100$$

Method for Measuring the Value of the Element Intensity-Basis Ratio of the Content of the Silica Fine Particle Relative to the Content of the Strontium Titanate Fine Particle on the Surface of the Toner Particle The value (Si/Sr) of the element intensity-basis ratio of the content of the silica fine particle relative to the content of the strontium titanate fine particle on the surface of the toner particle can be calculated on the basis of a measurement by X-ray fluorescence analysis (XRF).

The toner is pelletized by press molding, described below, to yield a sample; then Si atoms contained in the silica fine particle and Sr atoms specific to the strontium titanate fine particle that are to be analyzed are then quantified using the below-described wavelength-dispersive X-ray fluorescence analyzer.

(i) Example of the Device Used

X-ray fluorescence analyzer 3080 (by Rigaku Corporation)

(ii) Sample Preparation

A sample press molding machine of MAEKAWA Testing Machine (manufactured by MAYEKAWA Mfg. Co., Ltd.) is used for sample preparation. An aluminum ring (model number: 3481E1) is packed with 0.5 g of toner, and the toner is pelletized through pressing for 1 min under a load set to 5.0 tons.

(iii) Measurement Conditions

Measurement diameter: 10φ

Measurement potential, voltage 50 kV, 50 to 70 mA

2θ angle 25.12°

Crystal plate LiF

Measurement time 60 seconds (iv) Calculation of a Si Intensity Ratio Corresponding to Si Atoms Contained in the Silica Fine Particle An identical measurement is performed on the toner particle resulting from separation of the silica fine particle from the surface of the toner in accordance with the above-described method, in order to calculate the ratio of Si intensity corresponding to the Si atoms contained in the silica fine particle, in the Si intensity of the toner to be analyzed. The Si intensity corresponding to the Si atoms contained in the silica fine particle can be calculated on the basis of the expression below, from the measured Si intensity before silica separation and the measured Si intensity after silica separation.

(Si intensity ratio corresponding to Si atoms contained in silica fine particle)=(Si intensity before silica separation−Si intensity after silica separation)/(Si intensity before silica separation)

(v) Calculation of Si/Sr

Si/Sr=(Si intensity before silica separation×Si intensity ratio corresponding to Si atoms contained in silica fine particle/Sr intensity before silica separation)

Measurement of the Content of Si and of Residual Magnetization (σr) in the Magnetic Body The content of Si and the residual magnetization (σr) of the magnetic body are measured as follows.

Silica on the toner surface is separated in accordance with the above-described method, to yield a toner particle. The toner particle is dissolved in chloroform, and the magnetic body is retrieved using a magnet. The operation of immersing the obtained magnetic body in chloroform, and retrieving then the magnetic body using a magnet is repeated three times, in order to wash the magnetic body.

Then 200 mg of the obtained magnetic body is placed in a cup for liquid sample measurement for X-ray fluorescence measurement, and the magnetic body is spread evenly over the entire bottom surface. The content of Si in the magnetic body is quantified in accordance with a fundamental parameter method, using an X-ray fluorescence analyzer Axios (manufactured by PANalytical B. V.) with ancillary dedicated software "SuperQ ver. 4.0F" (manufactured by PANalytical B. V.). The measurement is performed under conditions of output of 2.4 kW in a He atmosphere, and target elements for measurement are from Na of atomic number 11 to U of atomic number 92.

Then σr of magnetic iron oxide particle in the obtained magnetic body is measured at room temperature of 25° C., under an external magnetic field of 795.8 kA/m and at a magnetic field sweep rate of 1.6 kA/m/s, using a vibration magnetometer VSMP-1-10 (by Toei Industry Co., Ltd.).

Measurement of the Content of the Magnetic Body

Silica on the toner surface is separated in accordance with the above-described method, to yield a toner particle. The mass of the obtained toner particle is measured. A magnetic body is obtained from the toner particle in accordance with the method described above, and then the mass of the obtained magnetic body is measured. The content of the magnetic body relative to 100 parts by mass of the toner particle is worked out from the mass of the toner particle and the mass of the magnetic body thus obtained.

Method for Measuring Weight-Average Particle Diameter (D4) of Toner

The weight-average particle diameter (D4) of the toner is calculated by using a precision particle diameter distribution measuring device "Coulter Counter Multisizer 3" (registered trademark, manufactured by Beckman Coulter, Inc.), which is based on a pore electrical resistance method and equipped with a 100 μm aperture tube, and dedicated software "Beckman Coulter Multisizer 3 Version 3.51" (manufactured by Beckman Coulter, Inc.) provided therewith for setting measurement conditions and analyzing the measurement data, performing measurements at the number of effective measurement channels of 25,000 and analyzing the measurement data.

For the electrolytic aqueous solution used for measurement, a solution in which special grade sodium chloride is dissolved in ion-exchanged water so that the concentration is about 1% by mass, for example, "ISOTON II" (manufactured by Beckman Coulter, Inc.) can be used.

Before performing the measurement and analysis, the dedicated software is set as follows.

At the "Change Standard Measurement Method (SOM) Screen" of the dedicated software, the total number of counts in control mode is set to 50,000 particles, the number of measurements is set to 1, and a value obtained using "Standard Particle 10.0 μm" (manufactured by Beckman Coulter Co., Ltd.) is set as the Kd value. The threshold and noise level are automatically set by pressing the threshold/noise level measurement button. Also, the current is set to 1600 μA, the gain is set to 2, the electrolytic solution is set to ISOTON II, and the flash of aperture tube after measurement is checked.

At the "Pulse to Particle Diameter Conversion Setting Screen" of the dedicated software, the bin interval is set to logarithmic particle diameter, the particle diameter bin is set to a 256 particle diameter bin, and the particle diameter range is set to from 2 μm to 60 μm.

The specific measurement method is as follows.

(1) About 200 ml of the electrolytic aqueous solution is placed in a 250 ml round-bottom glass beaker exclusively provided for Multisizer 3, the beaker is set on a sample stand, and a stirrer rod is stirred counterclockwise at 24 revolutions/second. Then, the dirt and air bubbles inside the aperture tube are removed using the "Flush Aperture Tube" function of the dedicated software.

(2) About 30 ml of the electrolytic aqueous solution is placed in a 100 ml flat-bottomed glass beaker, and about 0.3 ml of a diluent obtained by 3-fold by mass dilution of "CONTAMINON N" (a 10% by mass aqueous solution of a neutral detergent for washing precision measuring instruments at pH 7, which consists of a nonionic surfactant, an anionic surfactant, and an organic builder, manufactured by Wako Pure Chemical Industries, Ltd.) as a dispersing agent with ion-exchanged water is added thereto.

(3) A predetermined amount of ion-exchanged water is placed in a water tank of an ultrasonic disperser "Ultrasonic Dispersion System Tetora 150" (manufactured by Nikkaki Bios Co., Ltd.) having an electrical output of 120 W and containing two oscillators with an oscillation frequency of 50 kHz that are built in with a phase shift of 180 degrees, and about 2 ml of the CONTAMINON N is added to the water tank.

(4) The beaker of (2) is set in the beaker fixing hole of the ultrasonic disperser and the ultrasonic disperser is operated. The height position of the beaker is adjusted so that the resonance state of the liquid level of the electrolytic aqueous solution in the beaker is maximized.

(5) While the electrolytic aqueous solution in the beaker in (4) above is being irradiated with ultrasonic waves, about 10 mg of toner is added little by little to the electrolytic aqueous solution and dispersed. Then, the ultrasonic dispersion treatment is continued for another 60 sec. In the ultrasonic dispersion, the temperature of water in the water tank is appropriately adjusted to from 10° C. to 40° C.

(6) The electrolytic aqueous solution of (5) in which the toner is dispersed is dropped using a pipette into the round-bottomed beaker of (1) installed in the sample stand, and the measured concentration is adjusted to about 5%. The measurement is continued until the number of measured particles reaches 50,000.

(7) The measurement data are analyzed with the dedicated software provided with the device, and the weight-average particle diameter (D4) is calculated. The weight-average particle diameter (D4) is the "average diameter" on the analysis/volume statistics (arithmetic mean) screen when graph/vol % is set using the dedicated software.

EXAMPLES

Although the present disclosure will be described in more detail below with production examples and examples, these are not intended to limit the present disclosure in any way. All parts in the following formulations are parts by mass.

Production Example of Silica Fine Particle 1

Untreated dry silica as small-diameter inorganic fine particle (number-average particle diameter of primary particle 15 nm, BET specific surface area 200 $m^2/g$) and untreated dry silica as large-diameter inorganic fine particle (number-average particle diameter of primary particle is 35 nm, BET specific surface area 50 $m^2/g$) were loaded at a mass ratio of 10:1 and heated to 330° C. in a fluidized state created by stirring. The inside of the reactor was replaced with nitrogen gas, the reactor was sealed, and octamethylcyclotetrasiloxane was sprayed and mixed as a first surface treatment agent by using a spray nozzle until the gauge pressure reached 200 kPa. Thereafter, the reaction was conducted by continuing heating and stirring for 1 h to carry out a coating treatment.

After the treatment, the inside of the reaction system was replaced with a nitrogen atmosphere and heated to 330° C. again. Subsequently, as a second surface treatment agent, 10 parts of dimethyl silicone oil (KF-96-50CS, manufactured by Shin-Etsu Chemical Co., Ltd.) was sprayed on 100 parts of untreated dry silica, and then the coating treatment was similarly carried out for 1 h to obtain silica fine particle 1. Table 1-2 shows the physical properties of the silica fine particle 1.

Production Examples of Silica Fine Particles 2 to 6

Silica fine particles 2 to 6 were obtained in the same manner as in the production example of silica fine particle 1, except that the reaction time of the first surface treatment agent and the number of parts of the second surface treatment agent were changed as shown in Table 1-1. Table 1-2 shows the physical properties of the silica fine particles 2 to 6.

Regarding the structure of the second treatment component in Table 1-1, the structure of the substituent of the compound represented by the formula (3) is shown.

Production Example of Silica Fine Particle 7

Silica fine particle 7 was obtained in the same manner as in the production example of silica fine particle 1, except that untreated dry silica as small-diameter inorganic fine particle (number-average particle diameter of primary particle 15 nm, BET specific surface area 200 $m^2/g$) and untreated dry silica as large-diameter inorganic fine particle (number-average particle diameter of primary particle 35 nm, BET specific surface area 50 $m^2/g$) were loaded at a mass ratio of 6:1. Table 1-2 shows the physical properties of the silica fine particle 7.

Production Example of Silica Fine Particle 8

Silica fine particle 8 was obtained in the same manner as in the production example of silica fine particle 1, except that only untreated dry silica (number-average particle diameter of primary particle 15 nm, BET specific surface area 200 $m^2/g$) was loaded as inorganic fine particle. Table 1-2 shows the physical properties of the silica fine particle 8.

Production Examples of Silica Fine Particles 9 to 15

Silica fine particles 9 to 15 were obtained in the same manner as in the production example of silica fine particle 1, except that carbinol-modified silicone oil (KF-6002, manufactured by Shin-Etsu Chemical Co., Ltd.) was used as the second surface treatment agent, and the BET specific surface area of the loaded untreated dry silica, the reaction time of the first surface treatment agent, and the number of parts of the second surface treatment agent were changed as shown in Table 1-1. Table 1-2 shows the physical properties of the silica fine particles 9 to 15.

Production Example of Silica Fine Particle 16

Untreated dry silica (number-average particle diameter of primary particle 15 nm, BET specific surface area 200 $m^2/g$)

was loaded as inorganic fine particle and heated to 290° C. in a fluidized state created by stirring. The inside of the reactor was replaced with nitrogen gas, the reactor was sealed, and octamethylcyclotetrasiloxane was sprayed and mixed as the first surface treatment agent by using a spray nozzle until the gauge pressure reached 100 kPa. Thereafter, the reaction was conducted by continuing heating and stirring for 1 h to carry out a coating treatment.

After the treatment, the inside of the reaction system was replaced with a nitrogen atmosphere and heated to 290° C. again. Subsequently, as the second surface treatment agent, 15 parts of dimethyl silicone oil (KF-96-50CS, manufactured by Shin-Etsu Chemical Co., Ltd.) was sprayed on 100 parts of untreated dry silica, and then the coating treatment was similarly carried out for 1 h to obtain silica fine particle 16. Table 1-2 shows the physical properties of the silica fine particle 16.

Production Example of Silica Fine Particle 17

Untreated dry silica (number-average particle diameter of primary particle 15 nm, BET specific surface area 200 $m^2/g$) was loaded as inorganic fine particle and heated to 250° C. in a fluidized state created by stirring. The inside of the reactor was replaced with nitrogen gas, the reactor was sealed, and octamethylcyclotetrasiloxane was sprayed and mixed as a first surface treatment agent by using a spray nozzle until the gauge pressure reached 100 kPa. Thereafter, the reaction was conducted by continuing heating and stirring for 1 h to carry out a coating treatment and obtain silica fine particle 17. Table 1-2 shows the physical properties of the silica fine particle 17.

Production Example of Silica Fine Particle 18

Untreated dry silica (number-average particle diameter of primary particle 15 nm, BET specific surface area 200 $m^2/g$) was loaded as inorganic fine particle and heated to 250° C. in a fluidized state created by stirring. The inside of the reactor was replaced with nitrogen gas, the reactor was sealed, 30 parts of dimethyl silicone oil (KF-96-50CS, manufactured by Shin-Etsu Chemical Co., Ltd.) was sprayed on 100 parts of untreated dry silica while continuing stirring and keeping the temperature to maintain the fluidized state of silica, and the coating treatment was carried out for 1 h to obtain silica fine particle 18. Table 1-2 shows the physical properties of the silica fine particle 18.

Production Example of Silica Fine Particles 19 and 20

Silica fine particles 19 and 20 were obtained in the same manner as in the production example of silica fine particle 18, except that the number of parts of dimethyl silicone oil and the treatment temperature were changed as shown in Table 1-1. Table 1-2 shows the physical properties of the silica fine particles 19 and 20.

Production Example of Silica Fine Particle 21

Untreated dry silica (number-average particle diameter of primary particle 15 nm, BET specific surface area 200 $m^2/g$) was loaded as inorganic fine particle and heated to 250° C. in a fluidized state created by stirring. The inside of the reactor was replaced with nitrogen gas, the reactor was sealed, and 25 parts of hexamethyldisilazane was sprayed as the first surface treatment agent by using a spray nozzle. Thereafter, the reaction was conducted by continuing heating and stirring for 1 h to carry out a coating treatment.

After the treatment, the inside of the reaction system was replaced with a nitrogen atmosphere and heated to 250° C. again. Subsequently, 10 parts of dimethyl silicone oil (KF-96-50CS, manufactured by Shin-Etsu Chemical Co., Ltd.) was sprayed as the second surface treatment agent on 100 parts of untreated dry silica, and then the coating treatment was similarly carried out for 1 h to obtain silica fine particle 21. Table 1-2 shows the physical properties of the silica fine particle 21.

Production Example of Silica Fine Particle 22

Untreated dry silica (number-average particle diameter of primary particle 15 nm, BET specific surface area 200 $m^2/g$) was loaded as inorganic fine particle and heated to 250° C. in a fluidized state created by stirring. The inside of the reactor was replaced with nitrogen gas, the reactor was sealed, and 25 parts of hexamethyldisilazane was sprayed as the first surface treatment agent onto 100 parts of untreated dry silica by using a spray nozzle. Thereafter, the reaction was conducted by continuing heating and stirring for 1 h to carry out a coating treatment and obtain silica fine particle 22. Table 1-2 shows the physical properties of the silica fine particle 22.

Production Example of Magnetic Body 1

Into a ferrous sulfate aqueous solution there were mixed 1.05 equivalents, relative to iron, of a caustic soda solution, $P_2O_5$ in an amount of 0.15 mass % on a phosphorus basis relative to iron, and $SiO_2$ in an amount of 1.00 mass % on a silicon basis relative to iron, to prepare an aqueous solution containing ferrous hydroxide. With 8.0 as the pH of the aqueous solution, an oxidation reaction was carried out at 85° C. while air was blown into the aqueous solution, to prepare a slurry liquid having seed crystals.

Next, a ferrous sulfate aqueous solution was added to this slurry liquid, to an amount of 1.05 equivalents relative to the initial alkali amount (sodium component of caustic soda), after which the slurry liquid was maintained at pH 7.6, and an oxidation reaction was carried out while under blowing of air, to yield a slurry liquid containing magnetic iron oxide particle. The produced magnetic iron oxide particle was filtered using a filter press, were washed with a large amount of water, and were thereafter dried at 120° C. for 2 hours, to yield a particle that was thereupon subjected to a deagglomeration treatment, to yield Magnetic body 1 having a number-average particle diameter of 150 nm. Table 2 sets out the physical properties of Magnetic body 1.

Production Examples of Magnetic Bodies 2 to 5 and 7 to 11

Magnetic bodies 2 to 5 and 7 to 11 were obtained in the same way as an in the production example of Magnetic body 1, but herein the amount of $SiO_2$ that was mixed was adjusted so that the amount of Si took on the values given in Table 2, and the blowing amount of air and the oxidation reaction time were adjusted so that the number-average particle diameter took on the values given in Table 2. Table 2 sets out the physical properties of Magnetic bodies 2 to 5 and 7 to 11.

Production Example of Magnetic Body 6

Magnetic body 4 was dispersed again in water, and sodium silicate was added to the resulting slurry liquid in an amount of 0.20 mass % on a silicon basis, relative to 100 parts of magnetic particles. Thereafter the pH of the slurry liquid was adjusted to 6.0, and Magnetic body 6 was obtained through stirring. Table 2 sets out the physical properties of Magnetic body 6.

Production Example of Toner Particle 1

Production Example of a Toner by a Pulverization Method

| | |
|---|---|
| Binder resin | 100.0 parts |
| (Amorphous PES resin; amorphous polyester resin resulting from a condensation reaction of ethylene oxide and propylene oxide adducts of bisphenol A and terephthalic acid; Mw = 9500, Tg = 58° C.) | |
| Magnetic body 1 | 80.0 parts |
| Hydrocarbon wax | 5.0 parts |
| (Fischer-Tropsch wax; melting point 77° C.) | |
| Charge control agent | 1.0 part |
| (T-77: by Hodogaya Chemical Co., Ltd.) | |

The above materials were pre-mixed in an FM mixer (manufactured by Nippon Coke & Engineering Co., Ltd.) followed by kneading using a twin-screw kneading extruder (manufactured by Ikegai Corp.; PCM-30 model) set to a rotational speed of 3.33 $s^{-1}$, and with a set temperature adjusted so that the kneaded product temperature in the vicinity of the outlet of the kneaded product was 120° C. The obtained kneaded product was cooled, was coarsely pulverized with a hammer mill, and was then finely pulverized using a mechanical pulverizer (T-250 manufactured by Turbo Kogyo Co., Ltd.), whereupon the obtained finely pulverized powder was classified using a multi-grade classifier relying on the Coanda effect. Toner particle 1 having a weight-average particle diameter (D4) of 7.0 μm was obtained as a result. A magnetic body was present on the surface of the Toner particle 1.

Production Examples of Toner Particles 2 to 12, 15, 17 and 18

Toner particles 2 to 12, 15, 17 and 18 were obtained by carrying out an operation similar to that of the production method of Toner particle 1, but modifying herein the number of parts of the added magnetic body and the type of magnetic body to those in the conditions given in Table 3. Respective magnetic bodies were present on the surfaces of Toner particles 2 to 12, 15, 17 and 18.

Production Example of Toner Particle 13

Toner particle 13 was obtained by carrying out an operation similar to that of the production method of Toner particle 1, but modifying herein the type of the binder resin to a styrene/n-butylacrylate copolymer (styrene acrylic resin having a mass ratio of 78:22 of styrene and n-butylacrylate; Mw=8500, Tg=58° C.). A magnetic body was present on the surface of Toner particle 13.

Production Example of Toner Particle 14

Production Example of a Toner by Suspension Polymerization

Herein 450 parts of a 0.1 mol/L $Na_3PO_4$ aqueous solution were added to 720 parts of ion-exchanged water, with warming at a temperature of 60° C., followed by addition of 67.7 parts of a 1.0 mol/L $CaCl_2$ aqueous solution, to yield an aqueous medium containing a dispersion stabilizer.

| | |
|---|---|
| Styrene | 78.00 parts |
| n-butylacrylate | 22.00 parts |
| Polypropylene glycol #400 diacrylate (APG400) | 1.70 parts |
| Magnetic body 1 | 79.00 parts |

The above formulation was uniformly dispersed and mixed using an attritor (by Nippon Coke & Engineering Co., Ltd.).

The obtained monomer composition was heated to a temperature of 60° C., and the following materials were mixed and dissolved therein, to yield a polymerizable monomer composition.

| | |
|---|---|
| Hydrocarbon wax | 5.0 parts |
| (Fischer-Tropsch wax, melting point 77° C.) | |
| Charge control agent | 1.0 part |
| (T-77: by Hodogaya Chemical Co., Ltd.) | |
| Polymerization initiator | 10.00 parts |
| (t-butyl peroxypivalate (25% toluene solution)) | |

The polymerizable monomer composition was added to the aqueous medium, and granulation was performed through stirring at 12,000 rpm for 15 minutes at a temperature of 60° C. in a nitrogen atmosphere, in a TK-type homomixer (Tokushu Kika Kogyo Co., Ltd.). The resulting product was thereafter stirred with a paddle stirring blade, and a polymerization reaction was conducted at a reaction temperature of 70° C., for 300 minutes.

Once the reaction was over, the resulting suspension was heated up to 100° C. and was held at that temperature for 2 hours. Thereafter, as a cooling step, water at 0° C. was added to the suspension, and the suspension was cooled from 98° C. down to 30° C. at a rate of 200° C./min, followed by heating once more, and holding at 55° C. for 3 hours. Thereafter, the suspension was cooled by natural cooling at room temperature down to 25° C. The cooling rate at this time was 2° C./min.

Thereafter, hydrochloric acid was added to the suspension, and the suspension was thoroughly washed to dissolve the dispersion stabilizer; the resulting product was filtered and dried, to yield Toner particle 14 having a weight-average particle diameter (D4) of 7.3 μm. No magnetic body was present on the surface of Toner particle 14.

Production Example of Toner Particle 16

Toner particle 16 was obtained by carrying out a treatment operation similar to that of the production method of Toner particle 14, but modifying herein Magnetic body 1 to Magnetic body 7, and setting the number of parts of the magnetic body to 80.0 parts. No magnetic body was present on the surface of Toner particle 16.

Production Example of Toner 1

Herein 100 parts of Toner particle 1, 1.2 parts of Silica fine particle 1 and 0.17 parts of a strontium titanate fine particle (number-average particle diameter 1.2 μm) were charged into an FM mixer ("FM-10B" manufactured by Nippon Coke & Engineering Co., Ltd.), and were mixed for 180 seconds at a rotational speed of 3200 rpm, to yield a toner mixture.

Coarse particles were then removed using a sieve having a 300 mesh (48 μm mesh opening), to yield Toner 1.

Production Examples of Toners 2 and 4 to 45

Toners 2 and 4 to 45 were obtained by carrying out an operation similar to that of the production example of Toner 1, but herein the types of toner particle and silica fine particle, the number of parts of the added silica fine particle, and the number of parts of the added strontium titanate fine particle were modified as given in Table 3.

Production Example of Toner 3

Herein 100 parts of Toner particle 14 and 1 part of Magnetic body 1 were charged into an FM mixer ("FM-10B" manufactured by Nippon Coke & Engineering Co., Ltd.), and were mixed for 180 seconds at a rotational speed of 3500 rpm, followed by addition of 1.2 parts of Silica fine particle 1 and 0.17 parts of the strontium titanate fine particle (number-average particle diameter 1.2 μm), with mixing for 180 seconds at a rotational speed of 3200 rpm, to yield a toner mixture.

Coarse particles were then removed using a sieve having a 300 mesh (48 μm mesh opening), to yield Toner 3.

Example 1

Toner 1 was evaluated as follows.

In the evaluation there was used HP LaserJet Enterprise M609dn, with process speed modified to 410 mm/sec.

The evaluation paper used was Vitality (by Xerox Corporation, basis weight 75 g/cm$^2$, letter size).

Evaluation of Charge Retention and Charge Rising Performance

The above image output tester and a toner cartridge filled with evaluation toner were allowed to stand in a high-temperature, high-humidity environment at 32.5° C./80% RH, for one day or longer, after which there were outputted 1000 prints of a horizontal line pattern in which 4-dot horizontal lines were printed at 176-dot intervals, in the image output tester. Thereafter, the cartridge and the tester were allowed to stand in that same environment for 72 hours, and 100 prints were further outputted.

A charge quantity (C/g) of the toner on a developing carrier within the toner cartridge was measured, after output of the 1000 prints, after 72-hour standing, and following output of the further 100 prints after standing, using a blow-off powder charge quantity measuring device TB-200 (manufactured by Toshiba Chemical Corporation), and charge retention and charge rising performance under a high-temperature, high-humidity environment were evaluated.

The lower the rate of decrease in charge quantity after standing for 72 hours, the better is the charge retention of the toner.

Further, the higher the ratio of the charge quantity after output of 100 prints after standing, relative to the charge quantity after output of 1000 prints, the better is the charge rising performance of the toner. The evaluation criteria for charge retention and charge rising performance to be evaluated were established as follows.

Evaluation Criteria

Charge Retention (Charge quantity after 72-hour standing)/(charge quantity after output of 1000 prints)×100

A: 90% or more

B: 85% or more and less than 90%

C: 80% or more and less than 85%

D: 75% or more and less than 80%

E: less than 75%

Charge Rising Performance (Charge quantity after output of 100 prints following standing)/(charge quantity after output of 1000 prints)×100

A: 95% or more

B: 90% or more and less than 95%

C: 85% or more and less than 90%

D: 80% or more and less than 85%

E: less than 80%

Evaluation of Image Density Upon Standing in a High-Temperature, High-Humidity Environment The above image output tester and a toner cartridge filled with evaluation toner were allowed to stand in a high-temperature, high-humidity environment at 32.5° C./80% RH, for one day or longer, after which there were outputted 10000 prints of a horizontal line pattern in which 4-dot horizontal lines were printed at 176-dot intervals, in the image output tester. Thereafter, the cartridge and the tester were allowed to stand in that same environment for 72 hours.

After 72-hour standing a solid black image portion was formed, and the density of this solid black image was measured using a Macbeth reflection densitometer RD918 (manufactured by Macbeth Corporation). The evaluation criteria for image density after standing in a high-temperature, high-humidity environment were as follows.

Evaluation Criteria

A: 1.35 or more

B: 1.30 or more and less than 1.35

C: 1.25 or more and less than 1.30

C−: 1.20 or more and less than 1.25

D: 1.15 or more and less than 1.20

E: less than 1.15

Evaluation of Transferability

The above image output tester and a toner cartridge filled with evaluation toner were allowed to stand in a low-temperature, low-humidity environment at 15.0° C./10% RH for one day or longer, after which there were outputted 1000 prints of a horizontal line pattern in which 4-dot horizontal lines were printed at 176-dot intervals, in the image output tester.

The image forming apparatus was thereafter stopped halfway during solid image formation, and untransferred toner on the photosensitive member was stripped off by taping using Mylar tape. Numerical values resulting from by subtracting the density of the paper having had only Mylar tape affixed thereonto from the density of paper having had the stripped Mylar tape affixed thereonto were measured at five points, and the average value thereof was calculated. Density was measured using a Macbeth reflection densitometer RD918 (by Macbeth Corporation). Transferability was evaluated on the basis of the following criteria.

Evaluation Criteria

A: less than 0.05

B: 0.05 or more and less than 0.10

C: 0.10 or more and less than 0.20

D: 0.20 or more

Evaluation of Developing Member Contamination

The above image output tester and a toner cartridge filled with evaluation toner were allowed to stand in a high-temperature, high-humidity environment at 32.5° C./80% RH, for one day or longer, after which there were outputted 10000 prints of a horizontal line pattern in which 4-dot horizontal lines were printed at 176-dot intervals, in the image output tester.

Thereafter, the developing roller and the outputted half-tone image were checked for the presence or absence of vertical streaks, and contamination of the member was evaluated on the basis of the following evaluation criteria.

Evaluation Criteria

A: No observable vertical streaks in the paper ejection direction, either on the developing roller or on the image.

B: thin streaks observable on the developing roller in the circumferential direction; 5 or less vertical streaks observable on the image, in the paper ejection direction.

C: thin streaks observable on the developing roller in the circumferential direction; from 5 to 9 vertical streaks observable on the image, in the paper ejection direction.

D: thin streaks observable on the developing roller in the circumferential direction; from 10 to 19 vertical streaks observable on the image, in the paper ejection direction.

E: thin streaks observable on the developing roller in the circumferential direction; 20 or more vertical streaks observable on the image, in the paper ejection direction.

Evaluation of Cleaning Performance

The above image output tester and toner cartridge filled with evaluation toner were allowed to stand in a very low-temperature environment at 0° C./30% RH for one day or longer, after which there were outputted up to 10000 prints, as an upper limit, of a horizontal line pattern in which 4-dot horizontal lines were printed at 176-dot intervals, in the image output tester, until vertical streaks derived from faulty cleaning appeared at the edge of the image Cleaning performance was evaluated on the basis of the following evaluation criteria.

Evaluation Criteria

A: No faulty cleaning occurs even at 10000 prints.

B: 7,000 or more and less than 10,000 image output prints until the first appearance of vertical streaks derived from faulty cleaning C: 4,000 or more and less than 7,000 image output prints until the first appearance of vertical streaks derived from faulty cleaning D: 1,000 or more and less than 4,000 image output prints until the first appearance of vertical streaks derived from faulty cleaning E: Less than 1,000 image output prints until the first appearance of vertical streaks derived from faulty cleaning Evaluation of Low-Temperature Fixing Performance In a low-temperature fixing performance test, a fixing unit of the above image output tester was removed and, instead, an external fixing unit was used that had been modified so that the temperature of the fixing unit could be arbitrarily set and so that the process speed was 410 mm/sec. The above image output tester and a toner cartridge filled with evaluation toner were allowed to stand in a high-temperature, high-humidity environment at 25° C./50% RH, for one day or longer, after which a solid black unfixed image having had the toner laid-on level per unit surface area set to 0.5 $mg/cm^2$ was outputted, in the image output tester, and was run through the fixing unit the temperature of which had been adjusted to a set temperature.

The obtained fixed image was rubbed 5 times back and forth using lens-cleaning paper under a load of 4.9 kPa (50 $g/cm^2$); a fixation temperature was defined herein as the temperature at which a density decrease rate between before and after the rubbing test was 10% or lower. Density was measured using a Macbeth reflection densitometer RD918 (by Macbeth Corporation).

Low-temperature fixing performance was evaluated on the basis of the following evaluation criteria.

Evaluation Criteria

A: Fixation temperature is less than 220° C.

B: Fixation temperature is 220° C. or more and less than 230° C.

C: Fixation temperature is 230° C. or more and less than 240° C.

D: Fixation temperature is 240° C. or more

Examples 2 to 37

Evaluations were performed in the same way as in Example 1, but using herein Toners 2 to 35, 44 and 45.

Comparative Examples 1 to 8

Evaluations were performed in the same way as in Example 1, but using herein Toners 36 to 43.

TABLE 1-1

| Silica fine particle No. | Substrate BET/ $m^2/g$ | First treatment component: Treatment agent | First treatment component: Use amount/ kPa (for HDMS, number of parts) | First treatment component: Reaction time/h | Second treatment component: Terminus R1 structure | Second treatment component: Terminus R2 structure | Second treatment component: m | Second treatment component: Treated parts | Treatment temperature ° C. |
|---|---|---|---|---|---|---|---|---|---|
| 1 | 200 50 (10:1) | Octamethylcyclotetrasiloxane | 200 | 1 | Methyl group | Methyl group | 101 | 10 | 330° C. |
| 2 | 200 50 (10:1) | Octamethylcyclotetrasiloxane | 200 | 3 | Methyl group | Methyl group | 101 | 10 | 330° C. |
| 3 | 200 50 (10:1) | Octamethylcyclotetrasiloxane | 200 | 2 | Methyl group | Methyl group | 101 | 13 | 330° C. |

TABLE 1-1-continued

| | | First treatment component | | | Second treatment component | | | | |
|---|---|---|---|---|---|---|---|---|---|
| Silica fine particle No. | Substrate BET/$m^2$/g | Treatment agent | Use amount/kPa (for HDMS, number of parts) | Reaction time/h | Terminus R1 structure | Terminus R2 structure | m | Treated parts | Treatment temperature ° C. |
| 4 | 200 50 (10:1) | Octamethylcyclotetrasiloxane | 200 | 1 | Methyl group | Methyl group | 101 | 8 | 330° C. |
| 5 | 200 50 (10:1) | Octamethylcyclotetrasiloxane | 200 | 2 | Methyl group | Methyl group | 101 | 8 | 330° C. |
| 6 | 200 50 (10:1) | Octamethylcyclotetrasiloxane | 200 | 1 | Methyl group | Methyl group | 101 | 12 | 330° C. |
| 7 | 200 50 (6:1) | Octamethylcyclotetrasiloxane | 200 | 1 | Methyl group | Methyl group | 101 | 10 | 330° C. |
| 8 | 200 | Octamethylcyclotetrasiloxane | 200 | 1 | Methyl group | Methyl group | 101 | 10 | 330° C. |
| 9 | 200 | Octamethylcyclotetrasiloxane | 200 | 1 | Carbinol group | Carbinol group | 93 | 10 | 330° C. |
| 10 | 30 | Octamethylcyclotetrasiloxane | 200 | 1 | Carbinol group | Carbinol group | 93 | 9 | 330° C. |
| 11 | 380 | Octamethylcyclotetrasiloxane | 200 | 1 | Carbinol group | Carbinol group | 93 | 11 | 330° C. |
| 12 | 380 | Octamethylcyclotetrasiloxane | 200 | 1 | Carbinol group | Carbinol group | 93 | 10 | 330° C. |
| 13 | 300 | Octamethylcyclotetrasiloxane | 240 | 1 | Carbinol group | Carbinol group | 93 | 5 | 330° C. |
| 14 | 30 | Octamethylcyclotetrasiloxane | 240 | 1 | Carbinol group | Carbinol group | 60 | 3 | 330° C. |
| 15 | 380 | Octamethylcyclotetrasiloxane | 240 | 1 | Carbinol group | Carbinol group | 93 | 10 | 330° C. |
| 16 | 200 | Octamethylcyclotetrasiloxane | 100 | 1 | Methyl group | Methyl group | 101 | 15 | 290° C. |
| 17 | 200 | Octamethylcyclotetrasiloxane | 100 | 1 | — | — | — | 0 | 250° C. |
| 18 | 200 | — | — | — | Methyl group | Methyl group | 101 | 30 | 250° C. |
| 19 | 200 | — | — | — | Methyl group | Methyl group | 101 | 20 | 250° C. |
| 20 | 200 | — | — | — | Methyl group | Methyl group | 101 | 30 | 330° C. |
| 21 | 200 | Hexamethyldisilazane | 25 | 1 | Methyl group | Methyl group | 101 | 10 | 250° C. |
| 22 | 200 | Hexamethyldisilazane | 25 | 1 | — | — | | 0 | 250° C. |

In Silica fine particles 1 to 7 the column of substrate BET/$m^2$/g in Table 1-1 denotes a mass ratio of small-particle diameter silica: large-particle diameter silica=10:1 (6:1 in the case of Silica fine particle 7), for a small-diameter silica fine particle having a BET specific surface area of 200 $m^2$/g and for a large-diameter silica fine particle having a BET specific surface area of 50 $m^2$/g. The use amount column denotes parts with respect to hexamethyldisilazane (TEMIDS).

TABLE 1-2

| Silica fine particle No. | Sn | D/S | B | D/S/B before washing/ $10^{-4}$ | D/S/B after washing/ $10^{-4}$ | D1/D | C amount in intermediate body/% | C amount in final product/% | C amount immobilization rate/% | Number-average particle diameter/ nm | X/Y |
|---|---|---|---|---|---|---|---|---|---|---|---|
| 1 | 0.15 | 0.18 | 117 | 15 | 10 | 0.20 | 2.1 | 4.9 | 63 | 18 | 0.75 |
| 2 | 0.05 | 0.21 | 125 | 17 | 10 | 0.27 | 2.4 | 4.8 | 60 | 19 | 1.00 |
| 3 | 0.05 | 0.25 | 121 | 21 | 12 | 0.17 | 2.3 | 5.7 | 57 | 20 | 0.68 |
| 4 | 0.19 | 0.12 | 128 | 9.4 | 6.1 | 0.27 | 2.1 | 4.1 | 65 | 17 | 1.05 |
| 5 | 0.16 | 0.17 | 137 | 12 | 7.9 | 0.30 | 2.3 | 4.3 | 64 | 18 | 1.15 |
| 6 | 0.13 | 0.21 | 105 | 20 | 12 | 0.11 | 2.1 | 5.5 | 60 | 19 | 0.62 |
| 7 | 0.14 | 0.16 | 112 | 14 | 8.6 | 0.19 | 2.0 | 4.5 | 60 | 21 | 0.80 |
| 8 | 0.15 | 0.19 | 131 | 15 | 9.3 | 0.20 | 2.2 | 4.9 | 64 | 16 | 0.81 |
| 9 | 0.16 | 0.20 | 130 | 15 | 10 | 0.18 | 2.2 | 5.1 | 66 | 17 | 0.76 |
| 10 | 0.17 | 0.13 | 24 | 54 | 33 | 0.25 | 0.7 | 1.5 | 61 | 40 | 0.88 |
| 11 | 0.15 | 0.24 | 240 | 10 | 6.8 | 0.15 | 2.4 | 6.0 | 68 | 6 | 0.67 |
| 12 | 0.17 | 0.22 | 247 | 8.9 | 6.5 | 0.20 | 2.4 | 5.7 | 73 | 5 | 0.73 |
| 13 | 0.19 | 0.12 | 210 | 5.7 | 4.9 | 0.19 | 3.2 | 4.5 | 85 | 10 | 2.46 |
| 14 | 0.17 | 0.13 | 23 | 56 | 56 | 0.25 | 3.3 | 4.0 | 100 | 41 | 4.71 |
| 15 | 0.17 | 0.14 | 247 | 5.7 | 1.7 | 0.20 | 2.4 | 5.7 | 30 | 6 | 0.73 |
| 16 | 0.25 | 0.26 | 128 | 20 | 10 | 0.28 | 1.9 | 6.2 | 48 | 17 | 0.44 |
| 17 | 0.38 | 0.10 | 178 | 5.6 | 4.5 | 0.40 | — | 1.7 | 80 | 14 | — |
| 18 | 0.35 | 0.30 | 105 | 29 | 19 | 0.28 | — | 7.2 | 65 | 19 | — |
| 19 | 0.40 | 0.25 | 111 | 23 | 16 | 0.28 | — | 6.0 | 70 | 17 | — |
| 20 | 0.20 | 0.57 | 95 | 60 | 47 | 0.25 | — | 7.3 | 79 | 20 | |
| 21 | 0.10 | 0.15 | 110 | 14 | 7.2 | 0.00 | 2.7 | 5.1 | 53 | 17 | — |
| 22 | 0.10 | 0.00 | 131 | 0 | 0 | 0.00 | — | 2.7 | 95 | 14 | — |

In Table 1-2, Sn denotes $\{(a-b)\times c\times NA\}/(d\times e)$, B denotes the specific surface area ($m^2/g$) of the silica fine particle; D/S/B before washing denotes the value (D/S)/B of the ratio of the silica fine particle analyzed by solid-state $^{29}$Si-NMR DD/MAS; D/S/B after washing denotes the value (D/S)/B of the ratio of the silica fine particle after washing with chloroform C amount denotes the carbon amount; and number-average particle diameter denotes the number-average particle diameter of primary particle of the silica fine particle.

TABLE 2

| | Number-average particle diameter of primary particles | Si amount (mass %) | σr ($Am^2/kg$) |
|---|---|---|---|
| Magnetic body 1 | 150 nm | 1.0 | 9 |
| Magnetic body 2 | 200 nm | 1.0 | 7 |
| Magnetic body 3 | 120 nm | 1.0 | 10 |
| Magnetic body 4 | 150 nm | 3.3 | 4 |
| Magnetic body 5 | 150 nm | 0.5 | 16 |
| Magnetic body 6 | 150 nm | 3.5 | 4 |
| Magnetic body 7 | 150 nm | 4.8 | 2 |
| Magnetic body 8 | 150 nm | 0 | 20 |
| Magnetic body 9 | 100 nm | 0 | 22 |
| Magnetic body 10 | 150 nm | 1.2 | 8 |
| Magnetic body 11 | 150 nm | 0.9 | 9 |

In the table, Si amount denotes the content of Si in the magnetic body present on the surface of the toner particle, and σr denotes residual magnetization.

TABLE 3

| | Toner particle | Silica fine particle No. | Added parts of silica fine particle | Ssi/ area % | *1 | Magnetic body | Added parts of magnetic body | Sm/ area % | Sm/ Ssi | Added parts of strontium titanate fine particle | Si/ Sr | Msi/ (D/S)/B/ $10^2$ |
|---|---|---|---|---|---|---|---|---|---|---|---|---|
| Toner 1 | Toner particle 1 | 1 | 1.2 | 50 | Yes | Magnetic body 1 | 80 | 3.9 | 0.078 | 0.17 | 0.71 | 6.7 |
| Toner 2 | Toner particle 13 | 1 | 1.2 | 50 | Yes | Magnetic body 1 | 80 | 3.0 | 0.060 | 0.71 | 0.10 | 6.7 |
| Toner 3 | Toner particle 14 | 1 | 1.2 | 50 | Yes | Magnetic body 1 | 80 | 4.2 | 0.084 | 0.71 | 0.10 | 6.7 |
| Toner 4 | Toner particle 1 | 2 | 1.2 | 50 | Yes | Magnetic body 1 | 80 | 3.9 | 0.078 | 0.17 | 0.71 | 5.6 |
| Toner 5 | Toner particle 1 | 3 | 1.2 | 50 | Yes | Magnetic body 1 | 80 | 3.9 | 0.078 | 0.17 | 0.71 | 4.3 |
| Toner 6 | Toner particle 1 | 4 | 1.2 | 50 | Yes | Magnetic body 1 | 80 | 3.9 | 0.078 | 0.17 | 0.71 | 10 |
| Toner 7 | Toner particle 1 | 5 | 1.2 | 50 | Yes | Magnetic body 1 | 80 | 3.9 | 0.078 | 0.17 | 0.71 | 7.1 |
| Toner 8 | Toner particle 1 | 6 | 1.2 | 50 | Yes | Magnetic body 1 | 80 | 3.9 | 0.078 | 0.17 | 0.71 | 5.3 |
| Toner 9 | Toner particle 2 | 6 | 1.2 | 50 | Yes | Magnetic body 1 | 40 | 2.2 | 0.044 | 0.17 | 0.71 | 5.3 |
| Toner 10 | Toner particle 3 | 6 | 1.2 | 50 | Yes | Magnetic body 1 | 110 | 5.9 | 0.118 | 0.17 | 0.71 | 5.3 |
| Toner 11 | Toner particle 4 | 6 | 1.2 | 50 | Yes | Magnetic body 1 | 30 | 1.2 | 0.024 | 0.17 | 0.71 | 5.3 |
| Toner 12 | Toner particle 5 | 6 | 1.2 | 50 | Yes | Magnetic body 1 | 120 | 6.9 | 0.138 | 0.17 | 0.71 | 5.3 |
| Toner 13 | Toner particle 4 | 6 | 1.4 | 60 | Yes | Magnetic body 1 | 30 | 1.2 | 0.020 | 0.20 | 0.71 | 5.3 |
| Toner 14 | Toner particle 5 | 6 | 1.0 | 40 | Yes | Magnetic body 1 | 120 | 6.9 | 0.173 | 0.14 | 0.71 | 5.3 |
| Toner 15 | Toner particle 4 | 6 | 2.0 | 90 | Yes | Magnetic body 1 | 30 | 1.2 | 0.013 | 0.28 | 0.71 | 5.3 |
| Toner 16 | Toner particle 5 | 6 | 0.8 | 30 | Yes | Magnetic body 1 | 120 | 6.9 | 0.230 | 0.11 | 0.71 | 5.3 |
| Toner 17 | Toner particle 5 | 7 | 0.9 | 30 | Yes | Magnetic body 1 | 120 | 6.9 | 0.230 | 0.13 | 0.71 | 6.3 |
| Toner 18 | Toner particle 5 | 8 | 0.7 | 30 | Yes | Magnetic body 1 | 120 | 6.9 | 0.230 | 0.10 | 0.71 | 6.7 |
| Toner 19 | Toner particle 5 | 9 | 0.7 | 30 | Yes | Magnetic body 1 | 120 | 6.9 | 0.230 | 0.10 | 0.71 | 6.3 |
| Toner 20 | Toner particle 5 | 10 | 1.5 | 30 | Yes | Magnetic body 1 | 120 | 6.9 | 0.230 | 0.21 | 0.71 | 1.8 |
| Toner 21 | Toner particle 5 | 11 | 0.4 | 30 | Yes | Magnetic body 1 | 120 | 6.9 | 0.230 | 0.06 | 0.71 | 8.3 |
| Toner 22 | Toner particle 5 | 12 | 0.4 | 30 | Yes | Magnetic body 1 | 120 | 6.9 | 0.230 | 0.06 | 0.71 | 10 |
| Toner 23 | Toner particle 5 | 12 | 0.4 | 30 | Yes | Magnetic body 1 | 120 | 6.9 | 0.230 | 0.03 | 1.50 | 10 |
| Toner 24 | Toner particle 5 | 12 | 0.4 | 30 | Yes | Magnetic body 1 | 120 | 6.9 | 0.230 | 0.40 | 0.10 | 10 |
| Toner 25 | Toner particle 6 | 12 | 0.4 | 30 | Yes | Magnetic body 2 | 120 | 6.9 | 0.230 | 0.40 | 0.10 | 10 |
| Toner 26 | Toner particle 7 | 12 | 0.4 | 30 | Yes | Magnetic body 3 | 120 | 6.9 | 0.230 | 0.40 | 0.10 | 10 |
| Toner 27 | Toner particle 8 | 12 | 0.4 | 30 | Yes | Magnetic body 4 | 120 | 6.9 | 0.230 | 0.40 | 0.10 | 33 |
| Toner 28 | Toner particle 9 | 12 | 0.4 | 30 | Yes | Magnetic body 5 | 120 | 6.9 | 0.230 | 0.40 | 0.10 | 5 |
| Toner 29 | Toner particle 10 | 12 | 0.4 | 30 | Yes | Magnetic body 6 | 120 | 6.9 | 0.230 | 0.40 | 0.10 | 35 |
| Toner 30 | Toner particle 11 | 12 | 0.4 | 30 | Yes | Magnetic body 7 | 120 | 6.9 | 0.230 | 0.40 | 0.10 | 48 |
| Toner 31 | Toner particle 12 | 12 | 0.4 | 30 | Yes | Magnetic body 8 | 120 | 6.9 | 0.230 | 0.40 | 0.10 | 0 |
| Toner 32 | Toner particle 12 | 12 | 0.4 | 30 | Yes | Magnetic body 9 | 120 | 6.9 | 0.230 | 0.40 | 0.10 | 0 |
| Toner 33 | Toner particle 5 | 13 | 0.5 | 30 | Yes | Magnetic body 1 | 120 | 6.9 | 0.230 | 0.07 | 0.71 | 18 |
| Toner 34 | Toner particle 5 | 14 | 1.5 | 30 | Yes | Magnetic body 1 | 120 | 6.9 | 0.230 | 0.21 | 0.71 | 1.8 |
| Toner 35 | Toner particle 5 | 15 | 0.4 | 30 | Yes | Magnetic body 1 | 120 | 6.9 | 0.230 | 0.06 | 0.71 | 18 |
| Toner 36 | Toner particle 15 | 16 | 2.0 | 90 | Yes | Magnetic body 7 | 80 | 3.9 | 0.043 | 0.09 | 2.30 | 0 |
| Toner 37 | Toner particle 15 | 17 | 2.0 | 90 | Yes | Magnetic body 7 | 80 | 3.9 | 0.043 | 0.09 | 2.30 | 0 |
| Toner 38 | Toner particle 15 | 18 | 1.2 | 50 | Yes | Magnetic body 7 | 80 | 3.9 | 0.078 | 0.05 | 2.30 | 0 |
| Toner 39 | Toner particle 15 | 19 | 1.2 | 50 | Yes | Magnetic body 7 | 80 | 3.9 | 0.078 | 0.05 | 2.30 | 0 |
| Toner 40 | Toner particle 15 | 20 | 1.2 | 50 | Yes | Magnetic body 7 | 80 | 3.9 | 0.078 | 0.05 | 2.30 | 0 |
| Toner 41 | Toner particle 15 | 21 | 1.2 | 50 | Yes | Magnetic body 7 | 80 | 3.9 | 0.078 | 0.05 | 2.30 | 0 |
| Toner 42 | Toner particle 15 | 22 | 1.2 | 50 | No | Magnetic body 7 | 80 | 3.9 | 0.078 | 0.05 | 2.30 | 0 |
| Toner 43 | Toner particle 16 | 1 | 1.2 | 50 | Yes | Magnetic body 7 | 80 | 0.0 | 0.000 | 0.05 | 2.30 | 0 |
| Toner 44 | Toner particle 17 | 14 | 1.5 | 30 | Yes | Magnetic body 10 | 120 | 6.9 | 0.230 | 0.21 | 0.71 | 2.1 |
| Toner 45 | Toner particle 18 | 13 | 0.5 | 30 | Yes | Magnetic body 11 | 120 | 6.9 | 0.230 | 0.07 | 0.71 | 15 |

In the table, Ssi denotes the coverage ratio of the surface of the toner particle by the silica fine particle, *1 denotes the presence or absence of fragment ions of Formula (1); Sm denotes the abundance of the magnetic body on the surface of the toner particle; Si/Sr denotes the value of the element intensity-basis ratio of the content of the silica fine particle relative to the content of the strontium titanate fine particle in the toner, by X-ray fluorescence analysis; and Msi/(D/S)/B denotes a ratio of the content of Si in the magnetic body present on the surface of the toner particle relative to (D/S)/B.

In the table, E. represents Example, C. E. represents Comparative example, and T. represents Toner.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-075103, filed Apr. 28, 2022 and

TABLE 4

| | | Charge quantity (μC/g) | | | | | | | | | | | | | | Low-temperature fixing performance | |
|---|---|---|---|---|---|---|---|---|---|---|---|---|---|---|---|---|---|
| | | After 1000 prints | After 72-hour standing | After 100 prints | Charge retention | | Charge rising performance | | Image density | | Transferability | | Developing member contamination | Cleaning performance | (fixation temperature/° C.) | |
| E. 1 | T. 1 | −30.7 | −28.3 | −29.5 | A | 0.92 | A | 0.96 | A | 1.42 | A | 0.03 | A | A | A | 214 |
| E. 2 | T. 2 | −29.9 | −27.3 | −28.7 | A | 0.91 | A | 0.96 | A | 1.42 | A | 0.03 | A | A | A | 214 |
| E. 3 | T. 3 | −31.7 | −28.5 | −30.0 | A | 0.90 | A | 0.95 | A | 1.42 | A | 0.03 | A | A | A | 214 |
| E. 4 | T. 4 | −30.5 | −28.5 | −29.1 | A | 0.93 | A | 0.95 | A | 1.46 | A | 0.03 | A | A | A | 214 |
| E. 5 | T. 5 | −30.3 | −27.8 | −28.2 | A | 0.92 | B | 0.93 | A | 1.38 | A | 0.03 | A | A | A | 214 |
| E. 6 | T. 6 | −29.9 | −26.4 | −28.7 | B | 0.88 | A | 0.96 | A | 1.38 | A | 0.02 | A | A | A | 214 |
| E. 7 | T. 7 | −31.1 | −28.2 | −30.0 | A | 0.91 | A | 0.96 | A | 1.42 | A | 0.03 | A | A | A | 214 |
| E. 8 | T. 8 | −30.6 | −28.0 | −28.2 | A | 0.92 | B | 0.92 | A | 1.38 | A | 0.03 | A | A | A | 214 |
| E. 9 | T. 9 | −29.1 | −27.3 | −27.5 | A | 0.94 | A | 0.95 | A | 1.42 | A | 0.04 | A | A | A | 208 |
| E. 10 | T. 10 | −29.5 | −26.0 | −28.5 | B | 0.88 | A | 0.97 | A | 1.38 | A | 0.02 | A | A | B | 224 |
| E. 11 | T. 11 | −30.5 | −27.0 | −27.9 | B | 0.89 | B | 0.91 | B | 1.34 | B | 0.08 | A | A | A | 210 |
| E. 12 | T. 12 | −29.0 | −25.6 | −26.9 | B | 0.88 | B | 0.93 | B | 1.34 | A | 0.01 | A | A | B | 228 |
| E. 13 | T. 13 | −30.2 | −27.7 | −28.9 | A | 0.92 | A | 0.96 | A | 1.42 | B | 0.07 | A | A | A | 214 |
| E. 14 | T. 14 | −28.8 | −25.2 | −26.7 | B | 0.88 | B | 0.93 | B | 1.34 | A | 0.01 | A | A | B | 224 |
| E. 15 | T. 15 | −32.2 | −30.4 | −30.7 | A | 0.94 | A | 0.95 | A | 1.46 | B | 0.07 | A | A | B | 224 |
| E. 16 | T. 16 | −28.7 | −24.9 | −26.4 | B | 0.87 | B | 0.92 | B | 1.33 | A | 0.01 | A | A | B | 220 |
| E. 17 | T. 17 | −28.8 | −25.0 | −26.0 | B | 0.87 | B | 0.90 | B | 1.31 | A | 0.01 | A | A | B | 220 |
| E. 18 | T. 18 | −28.9 | −24.8 | −26.6 | B | 0.86 | B | 0.92 | B | 1.31 | A | 0.03 | B | A | B | 220 |
| E. 19 | T. 19 | −29.1 | −24.7 | −26.6 | B | 0.85 | B | 0.91 | B | 1.31 | A | 0.03 | B | A | B | 220 |
| E. 20 | T. 20 | −28.2 | −24.2 | −25.1 | B | 0.86 | C | 0.89 | B | 1.30 | A | 0.02 | B | A | B | 224 |
| E. 21 | T. 21 | −29.8 | −25.2 | −27.2 | B | 0.85 | B | 0.91 | B | 1.30 | A | 0.04 | B | B | B | 224 |
| E. 22 | T. 22 | −29.6 | −25.1 | −27.0 | B | 0.85 | B | 0.91 | B | 1.30 | B | 0.09 | C | C | B | 224 |
| E. 23 | T. 23 | −30.9 | −26.8 | −28.0 | B | 0.87 | B | 0.91 | B | 1.31 | B | 0.09 | C | C | B | 220 |
| E. 24 | T. 24 | −29.5 | −24.8 | −26.2 | C | 0.84 | C | 0.89 | C | 1.29 | B | 0.09 | C | B | B | 224 |
| E. 25 | T. 25 | −29.3 | −24.7 | −26.1 | C | 0.84 | C | 0.89 | C | 1.29 | B | 0.09 | C | B | B | 224 |
| E. 26 | T. 26 | −29.6 | −24.9 | −26.3 | C | 0.84 | C | 0.89 | C | 1.29 | B | 0.09 | C | B | B | 224 |
| E. 27 | T. 27 | −30.0 | −24.7 | −26.2 | C | 0.82 | C | 0.87 | C | 1.25 | B | 0.09 | C | B | B | 220 |
| E. 28 | T. 28 | −29.6 | −24.3 | −26.2 | C | 0.82 | C | 0.89 | C | 1.27 | B | 0.09 | C | B | B | 228 |
| E. 29 | T. 29 | −30.3 | −25.2 | −27.0 | C | 0.83 | C | 0.89 | C | 1.27 | B | 0.09 | C | B | B | 220 |
| E. 30 | T. 30 | −30.1 | −24.9 | −25.7 | C | 0.83 | C | 0.85 | C | 1.21 | B | 0.09 | C | B | B | 220 |
| E. 31 | T. 31 | −28.2 | −22.7 | −24.8 | C | 0.80 | C | 0.88 | C | 1.25 | B | 0.09 | C | B | C | 230 |
| E. 32 | T. 32 | −28.4 | −22.7 | −24.6 | C | 0.80 | C | 0.87 | C | 1.25 | B | 0.09 | C | B | C | 236 |
| E. 33 | T. 33 | −29.8 | −25.0 | −27.2 | C | 0.84 | B | 0.91 | C | 1.28 | C | 0.12 | C | C | B | 224 |
| E. 34 | T. 34 | −28.0 | −24.3 | −24.6 | B | 0.87 | C | 0.88 | B | 1.30 | B | 0.09 | C | C | B | 224 |
| E. 35 | T. 35 | −29.9 | −24.8 | −27.0 | C | 0.83 | B | 0.90 | C | 1.28 | B | 0.09 | C | B | B | 224 |
| E. 36 | T. 44 | −28.1 | −24.9 | −25.3 | B | 0.89 | B | 0.90 | B | 1.34 | B | 0.08 | C | C | B | 225 |
| E. 37 | T. 45 | −29.9 | −25.9 | −26.8 | B | 0.87 | B | 0.90 | B | 1.31 | C | 0.12 | C | C | B | 226 |
| C. E. 1 | T. 36 | −28.8 | −21.7 | −23.8 | D | 0.75 | D | 0.83 | D | 1.18 | A | 0.03 | C | C | D | 248 |
| C. E. 2 | T. 37 | −29.0 | −22.1 | −24.5 | D | 0.76 | D | 0.84 | D | 1.17 | A | 0.03 | B | E | D | 248 |
| C. E. 3 | T. 38 | −28.8 | −21.8 | −22.5 | D | 0.76 | E | 0.78 | E | 1.14 | A | 0.03 | E | B | C | 236 |
| C. E. 4 | T. 39 | −28.9 | −20.6 | −22.9 | E | 0.71 | E | 0.79 | E | 1.08 | A | 0.03 | D | C | C | 236 |
| C. E. 5 | T. 40 | −27.9 | −23.3 | −23.3 | C | 0.84 | D | 0.84 | C- | 1.20 | A | 0.03 | E | D | C | 236 |
| C. E. 6 | T. 41 | −28.5 | −21.6 | −23.3 | D | 0.76 | D | 0.82 | D | 1.18 | A | 0.03 | B | C | C | 236 |
| C. E. 7 | T. 42 | −29.0 | −21.0 | −24.0 | E | 0.72 | D | 0.83 | F | 1.14 | A | 0.03 | B | E | C | 236 |
| C. E. 8 | T. 43 | −29.8 | −27.0 | −27.3 | A | 0.91 | B | 0.92 | B | 1.34 | D | 0.25 | A | C | B | 224 |

Japanese Patent Application No. 2023-027654, filed Feb. 24, 2023 which are hereby incorporated by reference herein in their entirety.

What is claimed is:

1. A toner, comprising:

a toner particle comprising a magnetic body, the magnetic body being present on a surface of the toner particle; and a silica fine particle on the surface of the toner particle, wherein fragment ions corresponding to a structure represented by Formula (1) are observed in a measurement of the silica fine particle by time-of-flight secondary ion mass spectrometry (1)

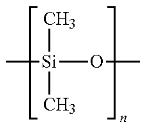

where n represents an integer of 1 or more;

when 2.00 g of the silica fine particle is dispersed in a mixed solution of 25.0 g of ethanol and 75.0 g of a 20 mass % aqueous solution of NaCl, followed by a titration operation using sodium hydroxide $$0.05 \leq Sn \leq 0.20$$

$$Sn=\{(a-b)\times c\times NA\}/(d\times e)$$

where a is a NaOH titer (L) required to adjust to 9.0 a pH of the mixed solution in which the silica fine particle has been dispersed, b is a NaOH titer (L) required to adjust to 9.0 a pH of the mixed solution, c is a concentration (mol/L) of the NaOH solution used for titration, NA is Avogadro's number, d is a mass (g) of the silica fine particle, and e is a BET specific surface area ($nm^2/g$) of the silica fine particle; and in a chemical shift obtained by solid-state $^{29}$Si-NMR DD/MAS of the silica fine particle, with D denoting an area of a peak having a peak top present in a range from −25 to −15 ppm, S denoting the sum total of areas of peaks of an M unit, a D unit, a T unit and a Q unit present in a range from −140 to 100 ppm, and B ($m^2/g$) denoting a specific surface area of the silica fine particle, a value (D/S)/B of a ratio of (D/S) relative to B is $5.7\times10^{-4}$ to $56\times10^{-4}$;

(D/S)/B measured after washing of the silica fine particle with chloroform is $1.7\times10^{-4}$ to $56\times10^{-4}$;

with D1 as an area of a peak having a peak top present in a range of more than −19 ppm and −17 ppm or less, in the chemical shift, a value (D1/D) of a ratio of D1 relative to D is 0.10 to 0.30.

2. The toner according to claim 1, wherein Sm is 1.0 to 7.0 area % when Sm (area %) is an abundance of the magnetic body on the surface of the toner particle.

3. The toner according to claim 1, wherein the toner particle comprises a binder resin, and a content of the magnetic body is 30 to 120 parts by mass relative to 100 parts by mass of the binder resin.

4. The toner according to claim 1, wherein Ssi is 30 to 90 area % when Ssi (area %) is a coverage ratio of the surface of the toner particle by the silica fine particle, calculated on the basis of an observation image of the surface of the toner using a scanning electron microscope.

5. The toner according to claim 1, wherein (Sm/Ssi) is 0.010 to 0.240 when Sm (area %) is an abundance of the magnetic body on the surface of the toner particle, and Ssi (area %) is a coverage ratio of the surface of the toner particle by the silica fine particle, calculated on the basis of an observation image of the surface of the toner using a scanning electron microscope.

6. The toner according to claim 1, wherein the silica fine particle is surface-treated with a compound represented by Formula (3)

(3)

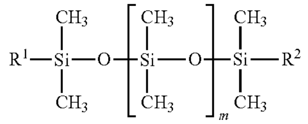

where $R^1$ and $R^2$ independently represent a carbinol group, a hydroxy group, an epoxy group, a carboxy group, an alkyl group or a hydrogen atom, and m is an integer of 1 to 200.

7. The toner according to claim 1, wherein a number-average particle diameter of primary particle of the silica fine particle is 5 to 50 nm.

8. The toner according to claim 1, wherein a carbon amount immobilization rate upon washing of the silica fine particle with chloroform is 30 to 70%.

9. The toner according to claim 1, wherein the toner further comprises a strontium titanate fine particle on the surface of the toner particle; and a value (Si/Sr) of an element intensity-basis ratio of a content of the silica fine particle relative to a content of the strontium titanate fine particle, on the basis of an X-ray fluorescence analysis of the toner, is 0.10 to 1.50.

10. The toner according to claim 1, wherein a content of Si in the magnetic body is 0.5 to 4.0 mass %.

11. The toner according to claim 1, wherein the silica fine particle is a silicone-oil-treated product of a silica fine particle treated with a cyclic siloxane.

12. The toner according to claim 1, wherein Msi/((D/S)/B) is $1.8\times10^2$ to $4.8\times10^3$ when Msi (mass %) is a content of Si in the magnetic body present on the surface of the toner particle.

13. The toner according to claim 1, wherein the silica fine particle comprises a silica fine particle A and a silica fine particle B;

a number-average particle diameter of a primary particle of the silica fine particle A is 5 to 25 nm;

a number-average particle diameter of a primary particle of the silica fine particle B is more than 25 nm and 50 nm or less; and a mass-based content ratio of the silica fine particle A and the silica fine particle B is 20:1 to 5:1.

* * * * *